United States Patent
Liu et al.

(10) Patent No.: US 11,867,856 B2
(45) Date of Patent: Jan. 9, 2024

(54) METHOD AND SYSTEM FOR REFLECTION-BASED TRAVEL TIME INVERSION USING SEGMENT DYNAMIC IMAGE WARPING

(71) Applicant: SAUDI ARABIAN OIL COMPANY, Dhahran (SA)

(72) Inventors: Lu Liu, Beijing (CN); Yubing Li, Beijing (CN); Weiguang He, Beijing (CN)

(73) Assignee: SAUDI ARABIAN OIL COMPANY, Dhahran (SA)

(*) Notice: Subject to any disclaimer, the term of this patent is extended or adjusted under 35 U.S.C. 154(b) by 198 days.

(21) Appl. No.: 17/338,080

(22) Filed: Jun. 3, 2021

(65) Prior Publication Data

US 2022/0390632 A1    Dec. 8, 2022

(51) Int. Cl.
*G01V 1/28*      (2006.01)
*G01V 1/30*      (2006.01)

(52) U.S. Cl.
CPC ............. *G01V 1/282* (2013.01); *G01V 1/303* (2013.01); *G01V 2210/51* (2013.01); *G01V 2210/614* (2013.01); *G01V 2210/675* (2013.01)

(58) Field of Classification Search
CPC ............................. G01V 1/282; G01V 1/303
USPC .......................................................... 702/14
See application file for complete search history.

(56) References Cited

U.S. PATENT DOCUMENTS

| | | |
|---|---|---|
| 9,442,207 B1 | 9/2016 | Dickson et al. |
| 9,702,997 B2 | 7/2017 | Sava et al. |
| 10,234,582 B2 * | 3/2019 | Zhang ............... G01V 1/282 |
| 10,324,205 B2 | 6/2019 | Wang et al. |
| 10,451,757 B2 | 10/2019 | Zhang et al. |

(Continued)

FOREIGN PATENT DOCUMENTS

CN      110187382 B      10/2020

OTHER PUBLICATIONS

Cui, T., et al., "Drift time estimation by dynamic time warping", 85th Annual International Meeting, SEG, Expanded Extracts, pp. 757-761, DOI: 10.1190/segam2015-5802864.1, 2015 (5 pages).

(Continued)

*Primary Examiner* — Paul D Lee
(74) *Attorney, Agent, or Firm* — Osha Bergman Watanabe & Burton LLP

(57) ABSTRACT

A computer-implemented method may include obtaining seismic data acquired in a time-domain for a subterranean region of interest. The method may further include obtaining a property model for the subterranean region of interest. The method may further include determining one or more time shifts using a segment dynamic image warping function based on the seismic data and the property model. The method may further include determining an adjoint source operator using the derived time shift and one-way wave equation. The method may further include updating the property model using a gradient solver in a data-domain reflection traveltime inversion. The method may further include outputting the updated property model for the subterranean region of interest. The method may further include generating a seismic image for the subterranean region of interest using the updated property model.

15 Claims, 16 Drawing Sheets

(56) References Cited

U.S. PATENT DOCUMENTS

| | | | |
|---|---|---|---|
| 10,641,915 | B2 | 5/2020 | Wahrmund et al. |
| 10,942,286 | B2 | 3/2021 | Albertin |
| 2016/0320505 | A1* | 11/2016 | D'Afonseca ............ G01V 1/345 |
| 2017/0115418 | A1* | 4/2017 | Gratacos ................ G01V 1/282 |
| 2017/0131418 | A1* | 5/2017 | Wang ..................... G01V 1/303 |
| 2020/0183035 | A1 | 6/2020 | Liu et al. |
| 2021/0003728 | A1 | 1/2021 | Wang et al. |
| 2021/0041589 | A1 | 2/2021 | Zhao et al. |
| 2021/0405236 | A1* | 12/2021 | Wang ..................... G01V 1/364 |
| 2022/0350042 | A1* | 11/2022 | Liu .......................... G01V 1/30 |

OTHER PUBLICATIONS

Liu, Lu, et al., "3D hybrid-domain full waveform inversion on GPU", Computers & Geosciences 83, pp. 27-36, DOI: http://dx.doi.org/10.1016/j.cageo.2015,06, 2015 (10 pages).

Liu, Lu, et al., "Three-dimensional data-domain full traveltime inversion using a practical workflow of early arrival selection", Geophysics, vol. 85, No. 4, pp. U77-U86, DOI: 10.1190/GEO2019-0476.1, Jul.-Aug. 2020 (10 pages).

Liu, Lu, et al., "Near-surface velocity estimation using source-domain full traveltime inversion and early-arrival waveform inversion", Geophysics, vol. 83, No. 4, pp. R335-R344, DOI 10.1190/GEO2017-0712.1, Jul.-Aug. 2018 (10 pages).

Hale, Dave, "Dynamic warping of seismic images", Geophysics, vol. 78, No. 2, pp. S105-S115, DOI: 10.1190/GEO2012-0327.1, Mar.-Apr. 2013 (11 pages).

Keogh, Eamonn J., et al., "Derivative Dynamic Time Warping", 2001 SIAM International Conference on Data Mining, pp. 1-11, 2001 (11 pages).

Ma, Yong, et al., "Wave-equation reflection traveltime inversion with dynamic warping and full-waveform inversion", Geophysics, vol. 78, No. 6, pp. R223-R233, DOI: 10.1190/GEO2013-0004.1, Nov.-Dec. 2013 (11 pages).

Sakoe, H., et al., "Dynamic Programming Algorithm Optimization for Spoken Word Recognition", IEEE Transactions on Acoustics, Speech, and Signal Processing, vol. ASSP-26, No. 1, pp. 43-49, Feb. 1978 (7 pages).

Sava, P., et al., "Wave-equation migration velocity analysis. I. Theory", Geophysical Prospecting, pp. 593-606, Jan. 2004 (14 pages).

Shen, Peng, et al., "Automatic velocity analysis via shot profile migration", Geophysics, vol. 73, No. 5, pp. VE49-VE59, DOI: 10.1190/2972021, Sep.-Oct. 2008 (11 pages).

Shin, Changsoo, et al., "Waveform inversion in the Laplace-Fourier domain", Geophys. J. Int. 177, DOI: 10.1111/j.1365-246X.2009.04102.x, pp. 1067-1079, 2009 (13 pages).

Soubaras, Robert, et al., "Velocity model building by semblance maximization of modulated-shot gathers", Geophysics, vol. 72, No. 5, DOI: 10.1190/1.2743612, pp. U67-U73, Sep.-Oct. 2007 (7 pages).

Wu, Ru-Shan, et al., "Seismic envelope inversion and modulation signal model", Geophysics, vol. 79, No. 3, DOI: 10.1190/GEO2013-0294.1, pp. WA13-WA24, May-Jun. 2014 (12 pages).

Xu, S., et al., "Full Waveform Inversion for Reflected Seismic Data", 74th EAGE Conference & Exhibition incorporating SPE EUROPEC 2012, W024, Jun. 4-7, 2012 (5 pages).

Zhao, Jiaping, et al., "shapeDTW: shape Dynamic Time Warping", Mauscript TKDE, pp. 1-14, Jun. 2016 (14 pages).

* cited by examiner

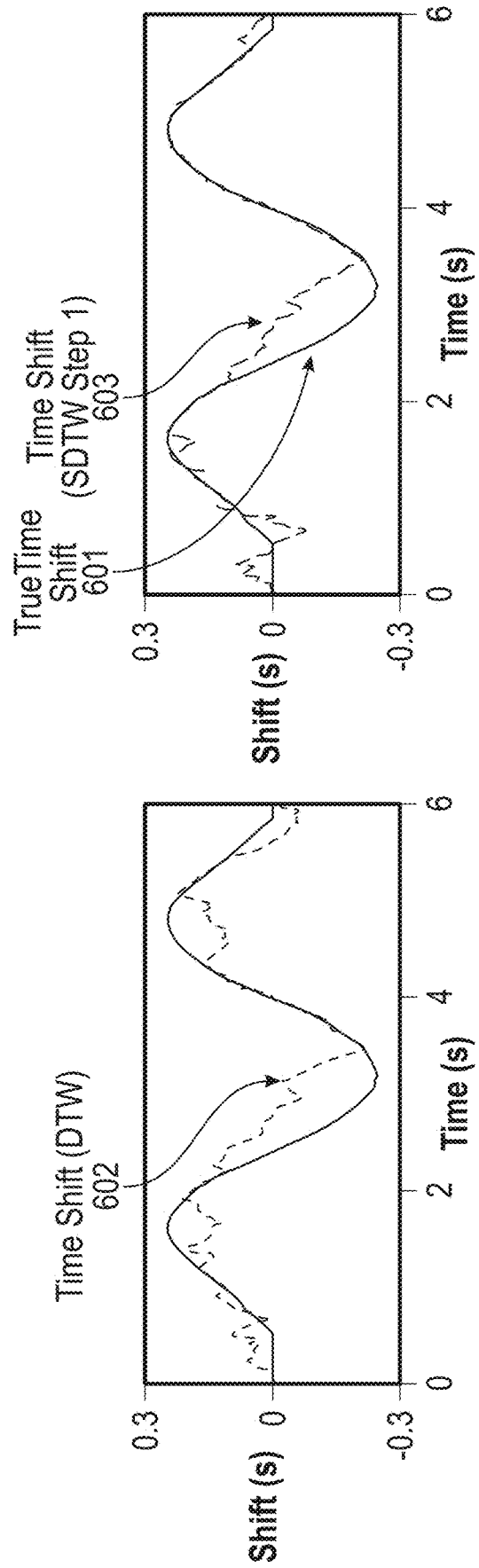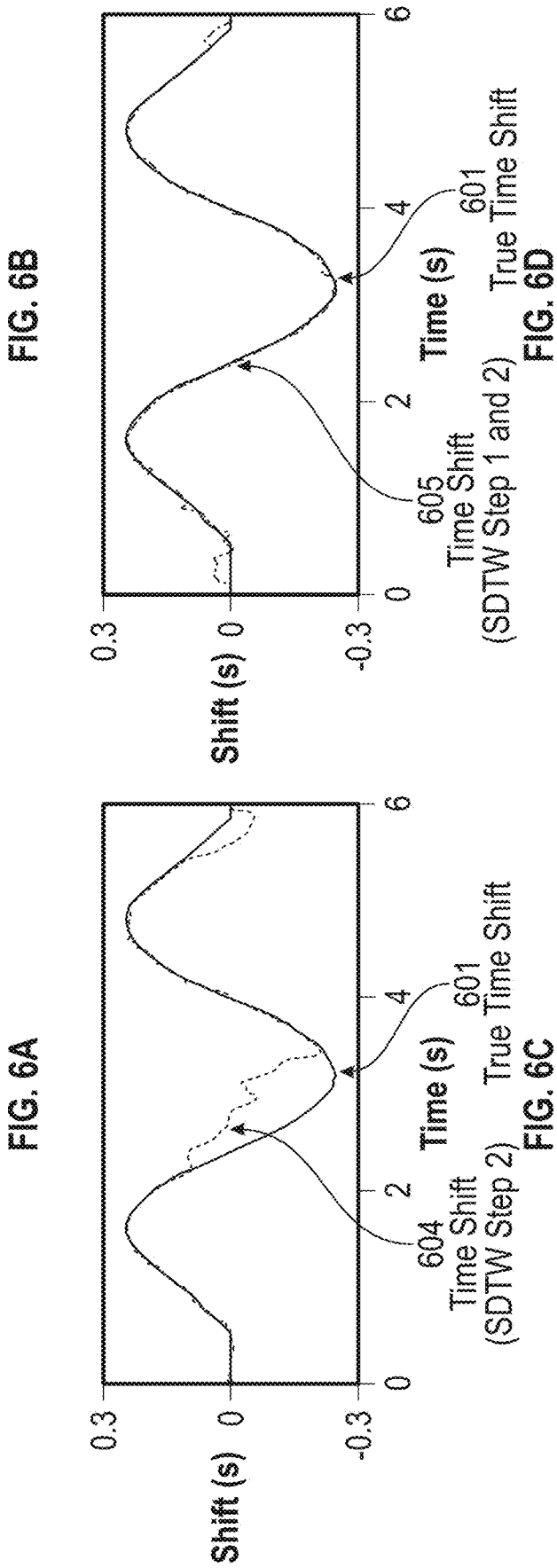

METHOD AND SYSTEM FOR REFLECTION-BASED TRAVEL TIME INVERSION USING SEGMENT DYNAMIC IMAGE WARPING

BACKGROUND

Accurate velocity model building is critical for subsurface imaging and reservoir delineation. A complete migration-wavefield inversion algorithm may convert time-domain seismic data into a depth representation of a subsurface. In particular, a full waveform inversion may be performed to build a high resolution model for seismic imaging and reservoir characterization. The model may represent different particle velocity values in the subsurface. However, full waveform inversion may require a high quality background model as an initial model to update the model in a number of iterations at an expensive computation cost.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining seismic data acquired in a time-domain for a subterranean region of interest. The method further includes obtaining a property model for the subterranean region of interest. The method further includes determining one or more time shifts using a segment dynamic image warping function based on the seismic data and the property model. The method further includes determining an adjoint source operator using the derived time shift and one-way wave equation. The method further includes updating the property model using a gradient solver in a data-domain reflection traveltime inversion. The method further includes outputting the updated property model for the subterranean region of interest. The method further includes generating a seismic image for the subterranean region of interest using the updated property model.

In general, in one aspect, embodiments relate to a system that includes a seismic surveying system. The system further includes a seismic source and a plurality of seismic receivers. The system further includes a seismic interpreter including a computer processor. The seismic interpreter is coupled to the seismic surveying system. The seismic interpreter obtains seismic data acquired in a time-domain for a subterranean region of interest. The seismic interpreter obtains a property model for the subterranean region of interest. The seismic interpreter determines one or more time shifts using a segment dynamic image warping function based on the seismic data and the property model. The seismic interpreter determines an adjoint source operator using the derived time shift and one-way wave equation. The seismic interpreter updates the property model using a gradient solver in a data-domain reflection traveltime inversion. The seismic interpreter outputs the updated property model for the subterranean region of interest. The seismic interpreter generates a seismic image for the subterranean region of interest using the updated property model.

In general, in one aspect, embodiments relate to a non-transitory computer readable medium storing instructions executable by a computer processor. The instructions include obtaining seismic data acquired in a time-domain for a subterranean region of interest. The instructions further include obtaining a property model for the subterranean region of interest. The instructions further include determining one or more time shifts using a segment dynamic image warping function based on the seismic data and the property model. The instructions further include determining an adjoint source operator using the derived time shift and one-way wave equation. The instructions further include updating the property model using a gradient solver in a data-domain reflection traveltime inversion. The instructions further include outputting the updated property model for the subterranean region of interest. The instructions further include generating a seismic image for the subterranean region of interest using the updated property model.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 6A, 6B, 6C, and 6D show examples in accordance with one or more embodiments.

DETAILED DESCRIPTION

Figure 1:
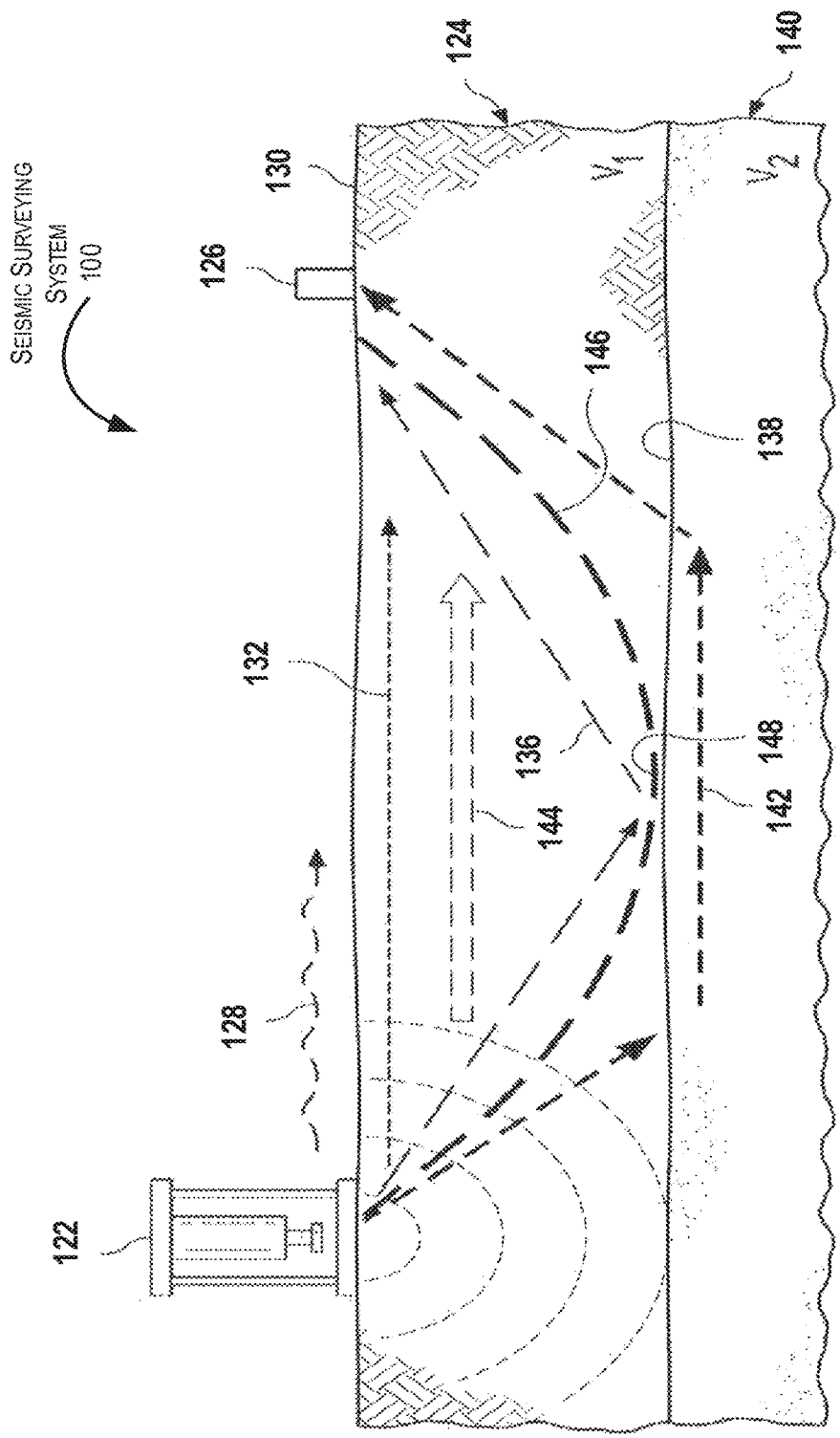
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for performing a data-domain reflection traveltime inversion (DRTI) using a segment dynamic image warping (SDIW) function. The data-domain reflection traveltime inversion is applied to generate a kinematically accurate property model (e.g., a velocity model) based on reflection energy and one-way wave equation for seismic imaging and velocity model building. For example, the data-domain reflection traveltime inversion generates a high quality background property model to correctly image geological structures in the subsurface by matching traveltime information between predicted data (e.g., demigrated data) and acquired seismic data. As another example, the data-domain reflection traveltime inversion may generate a kinematically accurate property model as an initial model for full waveform inversion (FWI) to further refine the model with short-wavelength components.

Furthermore, the data-domain reflection traveltime inversion uses a misfit function based on the traveltime difference measured by applying a segment dynamic image warping function between predicted data obtained using a migration function and acquired seismic data in order to solve a least-squares optimization problem. However, there are several difficult problems to obtaining a high quality property model. For example, a property model (e.g., a velocity model) of a geological region of interest may be affected by strong noise, migration artifacts, and various unwanted signals due to subsurface complexity and seismic acquisition limitations, such as low velocity zones. As another example, a particular data-domain reflection traveltime inversion may have a slow convergence. As such, some embodiments address these problems by applying a segment dynamic image warping function within a data-domain reflection traveltime inversion algorithm. In particular, the segment dynamic image warping includes a point-wise segment-to-segment matching function to measure the accumulative distance (e.g., Euclidean distance, minus cosine of the angle, sum of absolute differences, etc.) between two signals for the stacked windowed polynomial fitting result for each segment. Thus, the segment dynamic image warping function enhances robustness of the signals alignment and reliable time shifts estimation between predicted data and acquired seismic data.

Turning to FIG. 1, FIG. 1 shows a schematic diagram in accordance with one or more embodiments. FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), diving wave A (142), or diving wave B (146), through a subsurface layer (124). Pressure waves generated by the seismic source (122) may travel along several paths through a subsurface layer (124) at a particle velocity $V_1$ for detection at a number of seismic receivers (126) along the line of profile. Likewise, particle velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a particle velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a particle velocity $V_1$, while subsurface layer (140) has a particle velocity $V_2$. In words, different subsurface layers may correspond to different particle velocity values. In particular, a particle velocity may refer to the speed that a pressure wave travels through a medium, e.g., diving wave B (146) that makes a curvilinear ray path (148) through subsurface layer (124). Particle velocity may depend on a particular medium's density and elasticity as well as various wave properties, such as the frequency of an emitted pressure wave. Where a particle velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the particle velocity $V_1$ through the subsurface layer (124) to the seismic receivers (126).

Turning to refracted pressure waves, the seismic source (122) may also generate a refracted wave (i.e., diving wave A (142)) that is refracted at the subsurface interface (138) and travels along the subsurface interface (138) for some distance as shown in FIG. 1 until traveling upwardly to the seismic receivers (126). As such, refracted pressure waves may include diving waves (e.g., diving wave A (142), diving wave B (146)) that may be analyzed to map the subsurface layers (124, 140). For example, a diving wave may be a type of refracted wave that is continuously refracted throughout an earth's subsurface. Thus, a diving wave may be generated where particle velocities are gradually increasing with depth at a gradient. Likewise, the apex of a diving wave may be offset from a common midpoint (CMP) in contrast to reflected seismic energy. Though, for analysis purposes, an apex of a diving wave may be regarded as a common midpoint for the refracted energy. As such, the apex may serve as the basis for organizing and sorting a seismic survey dataset.

Furthermore, in analyzing seismic data acquired using the seismic surveying system (100), seismic wave propagation may be approximated using rays. For example, reflected waves (e.g., reflected wave (136)) and diving waves (e.g., diving waves (142, 146)) may be scattered at the subsurface interface (138). In FIG. 1, for example, the diving wave B (146) may exhibit a ray path of a wide angle that resembles a reflected wave in order to map the subsurface. Using diving waves, for example, a velocity model for an underlying subsurface may be generated that describes the particle velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a global optimum that satisfies a predetermined criterion.

With respect to velocity models, a velocity model may map various subsurface layers based on particle velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types change, such as interfaces between different subsurface layers. In some embodiments, a velocity model is updated using one or more tomographic updates to adjust the velocity boundaries in the velocity model.

Figure 2:
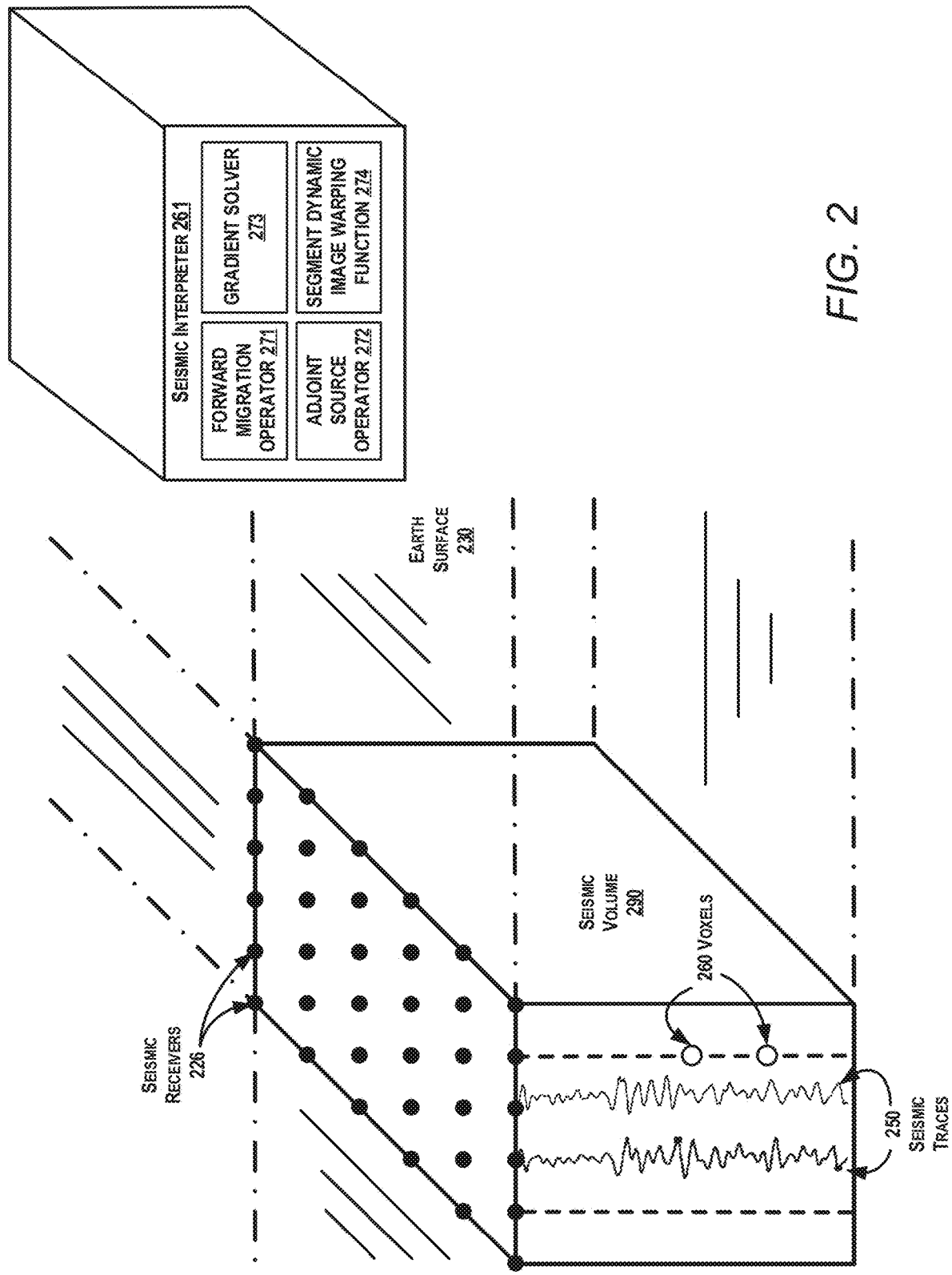

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a three-dimensional cubic dataset of seismic traces for 2D cases. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a three-dimensional array of seismic receivers (226) are disposed along the earth's surface (230) and acquire seismic data in response to various pressure waves emitted by seismic sources. Within the voxels (260), statistics may be determined on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some contexts, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot-Xrec).

In some embodiments, seismic data are processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to wave equation migration (e.g., one-way wave equation migration, reverse time migration, etc.). In wave equation migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the down-going wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Furthermore, in some embodiments, seismic data are processed to generate one or more seismic images for model building. Seismic imaging may be performed using an iterative process called inversion. Inversion may transform pre-processed shot gathers from a data domain to an image domain that corresponds to depth data. Likewise, various types of inversion algorithms may be used in seismic imaging. For example, a data-domain reflection traveltime inversion is performed to determine a kinematically accurate background model. As another example, a full waveform inversion is performed to determine a high resolution model. Because full waveform inversion suffers from the cycle-skipping problem, many applications are used to avoid the cycle-skipping effect during full waveform inversion. For example, the full waveform inversion uses low frequency data (e.g., envelop or intensity of the data, artificial low frequency data) that are obtained using a mathematical operation (e.g., a Laplace-Fourier transform) from acquired seismic data.

Furthermore, as another example, a high quality background property model is generated to relax the requirement of low frequency data. There are various methods to determine a kinematically accurate background property model.

Particularly, an image-domain algorithm (e.g., migration velocity analysis (MVA)) determines a background property model by maximizing the stacking power of flat or sloped common image gathers (CIGs) in the offset domain or in the angle domain. Likewise, a data-domain algorithm (e.g., reflection traveltime inversion, reflection waveform inversion) determines a background property model by matching traveltime and/or waveform information between demigrated data and observed seismic data.

Furthermore, the image-domain inversion algorithms are in general more robust than the data-domain inversion algorithms because the image-domain inversion algorithms are less sensitive to a poor initial model and deficiency of low frequencies. However, the image-domain inversion algorithms generally achieve a lower resolution model with more computational costs and memory requirements than the data-domain inversion algorithms. As thus, a data-domain inversion algorithm is desired to build a high quality background model for seismic imaging and model building.

Keeping with seismic imaging, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes multiple NMO gathers with amplitudes sampled from a common midpoint (CMP). In particular, a NMO correction may be a seismic imaging approximation based on determining reflection travel times. However, NMO-stack results may not indicate an accurate subsurface geology, where the subsurface geology is complex with large heterogeneities in particle velocities or when a seismic survey is not acquired on a horizontal plane. Ocean-Bottom-Node surveys and rough topographic land seismic surveys may be examples where NMO-stack results fail to depict subsurface geologies.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Turning to the seismic interpreter (261), a seismic interpreter (261) may include hardware and/or software with functionality for storing the seismic volume (290), well logs, core sample data, and other data for seismic data processing, well data processing, training operations, and other data processes accordingly. In some embodiments, the seismic interpreter (261) may include a computer system that is similar to the computer (602) described below with regard to FIG. 12 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Keeping with the seismic interpreter (261), seismic interpreter (261) may include hardware and/or software with functionality for performing one or more simulations using one or more components (e.g., forward migration operator (271), adjoint source operator (272), gradient solver (273), segment dynamic image warping function (274)) of a data-domain reflection traveltime inversion for use in analyzing seismic data and one or more subsurface formations. For example, seismic interpreter (261) may use one-way wave equation to generate the sensitivity kernels for handling the complex geological settings, such as low velocity zones. A one-way wave equation is a partial differential equation whose solutions include only waves that propagate in one direction. As another example, seismic interpreter (261) may use seismic data to generate a property model of interest (e.g., a velocity model) with a data-domain reflection traveltime inversion. Seismic interpreter (261) may iteratively update the property model in an inversion process using a forward migration operator (271) and an adjoint source operator (272). A forward migration operator (271) performs a numerical simulation based on one-way wave equation forward modeling to generate forward wavefields and predicted synthetic data for a property model. An adjoint source operator (272) performs a numerical simulation based on one-way wave equation modeling to generate adjoint wavefields for a property model. The adjoint source operator may be built through analyzing an explicit matrix formulation of the forward propagation. For example, a time-domain finite-difference (TDFD) scheme may be applied to implement the forward migration operator and the adjoint source operator.

Furthermore, a gradient solver (e.g., gradient solver (273)) iteratively updates the property model of interest by numerically solving partial differential equations or optimization problems in a data-domain reflection traveltime inversion. For example, the gradient solver may integrate the cross-correlation between source-side wavefield's derivative (e.g., forward wavefields) and receiver-side wavefields (e.g., adjoint wavefields) over time up to the maximum record time to determine the gradient of current residual defined by a misfit function. As another example, the gradient solver may use the gradient of current residual and previous search directions to determine the conjugate gradient which is the search direction of current iteration. In some embodiments, the conjugate gradient algorithm is a direct method to seek the exact numerical solution after a finite number of iterations for particular systems of linear equations whose matrix is positive definite, large and sparse. Likewise, the conjugate gradient algorithm may provide a unique solution for a quadratic function. For example, the conjugate gradient algorithm may be applied to numerically solve partial differential equations or optimization problems in a least-squares optimization problem. At each iteration, the conjugate gradient algorithm may determine a search direction (e.g., a conjugate gradient) to seek the final solution of the property model which is conjugate to the gradient of current residual defined by a misfit function and previous search directions.

Furthermore, a segment dynamic image warping function (e.g., segment dynamic image warping function (274)) may include a point-wise segment-to-segment matching to determine time shift between demigrated data and obtained seismic data. A dynamic image warping function is a multi-dimensional application based on dynamic time warping (DTW) which aligns two one-dimensional (1D) temporal sequences with local squeezing or stretching which is suitable for extracting time shifts between two signals. Because the alignment error is defined based on amplitude matching, a dynamic time warping function is an amplitude-sensitive algorithm. Various dynamic time warping functions (e.g., a derivative dynamic time warping, a smooth dynamic time warping) are used to match signal trend and noisy signals. However, time shift derived by a dynamic time warping function still contains severe horizontal inconsistency due to lack of horizontal constraints.

Furthermore, the segment dynamic image warping function calculates the accumulative distance between two signals for the stacked windowed polynomial fitting result for each segment. Thus, the segment dynamic image warping function enhances robustness of the signals alignment and reliable time shift estimation for the data-domain reflection traveltime inversion based on one-way wave equation. The segment dynamic image warping function may handle very noisy images with large and rapidly varying shifts compared to conventional dynamic image warping (DIW) derived misfit result. In some embodiments, the seismic interpreter (261) may apply one or more segment dynamic image warping functions to determine time shift between demigrated data and obtained seismic data (e.g., see the accompanying description to FIG. 3) to satisfy a predetermined misfit function or other predetermined criteria.

In some embodiments, a seismic interpreter determines the forward wavefields and/or adjoint wavefields using a forward migration operator and/or an adjoint source operator in order to update a property model. For example, a property model may correspond to a model that describes property values such as anisotropy, attenuation, density, P-wave velocity, and/or S-wave velocity. Likewise, the complexity of the property model may be associated with the computation cost of updating the property model using the forward wavefields and/or adjoint wavefields. In some embodiments, a seismic interpreter applies one or more modeling algorithms (e.g., a finite-difference modeling algorithm) to determine migration operators based on one-way wave equation.

Figure 3:
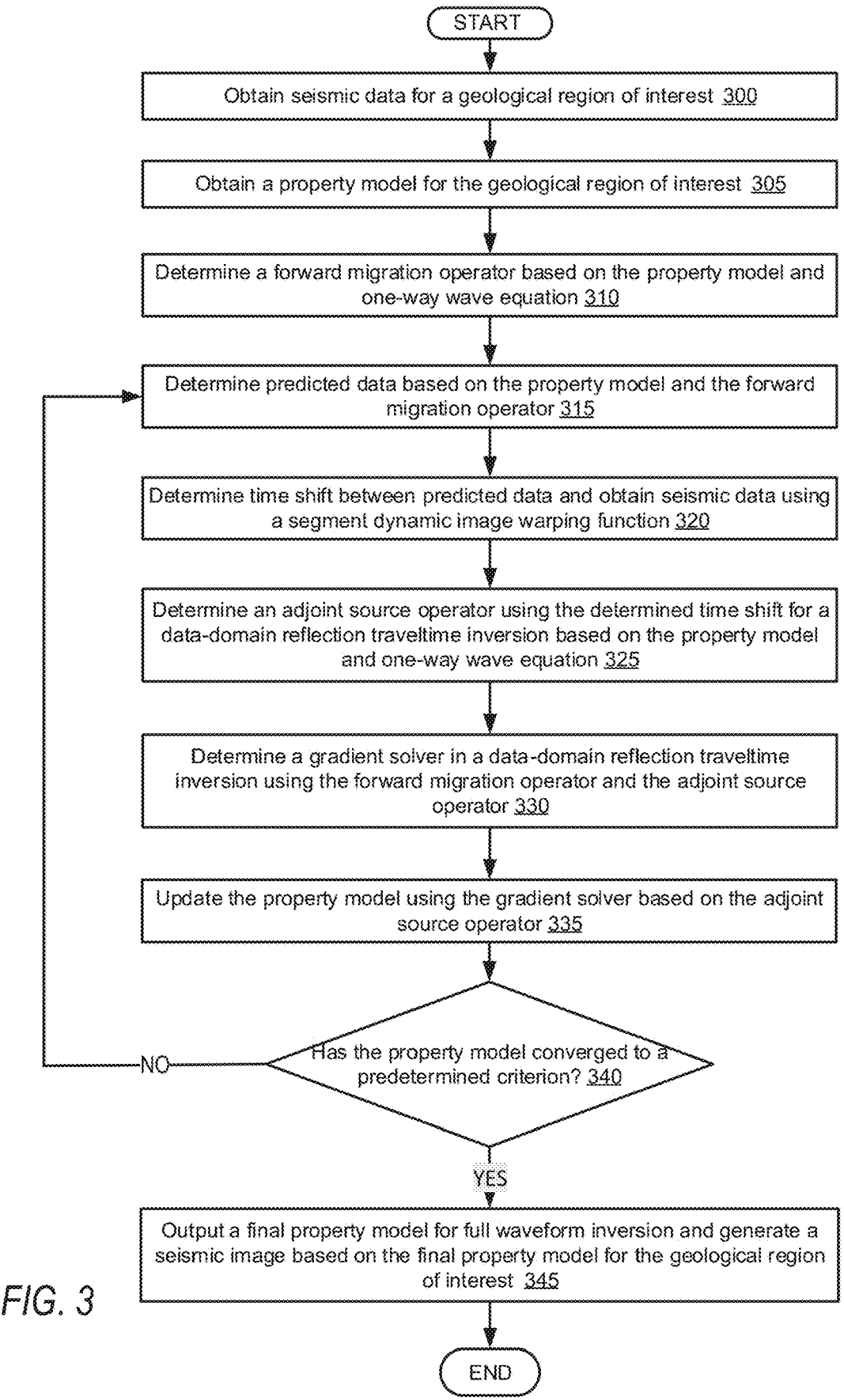
FIG. 3 shows a flowchart in accordance with one or more embodiments.

Turning to FIG. 3, FIG. 3 shows a flowchart in accordance with one or more embodiments. Specifically, FIG. 3 describes a general method for generating a property model of interest based on a data-domain reflection traveltime inversion using a segment dynamic image warping function and one-way wave equation. One or more blocks in FIG. 3 may be performed by one or more components (e.g., seismic interpreter (261)) as described in FIGS. 1-2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, seismic data are obtained for a geological (or subterranean) region of interest in accordance with one or more embodiments. Seismic data may be similar to the seismic data described above in regard to FIGS. 1 and 2. A geological region of interest may be a portion of a geological area or volume desired or selected for further analysis, e.g., for hydrocarbon exploration or enhancing future hydrocarbon production or reservoir development purposes for a respective reservoir.

In Block 305, a property model is obtained for a geological region of interest in accordance with one or more embodiments. The goal of a data-domain reflection traveltime inversion is to seek an optimal model that kinematically matches demigrated data and obtained seismic data. For example, a data-domain reflection traveltime inversion determined an updated model by minimizing a predetermined misfit function (equation 1) based on time shift (equation 2) between demigrated data $p(x_r, t; x_s)$ and obtained seismic data $d(x_r, t; x_s)$.

$$E = \iint \Delta \tau(x_r, t; x_s)^2 dx_r dt \quad \text{Equation 1}$$

$$\Delta \tau(x_r, t; x_s) = F[p(x_r, t; x_s), d(x_r, t; x_s)] \quad \text{Equation 2}$$

where E is a predetermined misfit function, $\Delta \tau$ is the time shift between observed seismic data $d(x_r, t; x_s)$ and demigrated data $p(x_r, t; x_s)$, which is computed by the operator F of dynamic warping, t is travel time, and $x_r$ and $x_s$ are the receiver and source locations, respectively.

In some embodiments, background S-wave velocities are assumed to have no effect on the source-side kinematics in regard to the P-wave velocity model. In some embodiments, the property model is a model for a property of interest to be updated using the data-domain reflection traveltime inversion. For example, the property model may describe the reflectivity for P-waves at different regions within a subsurface. Specifically, the initial property model may have a value of "0" at different regions within a subsurface, or the value is a known from previous seismic data processing. As another example, the property model describes the P-wave velocity at different regions within a subsurface. Specifically, the initial property model is a smooth background velocity model, or the model is a known from previous seismic data processing. The data-domain reflection traveltime inversion may update the property model using an adjoint source operator in the velocity model building process.

In Block 310, a forward migration operator is determined based on a property model and one-way wave equation in accordance with one or more embodiments. The forward migration operator generates forward wavefields and demigrated data based on the property model. The forward migration operator may be formulated in a linear system with a matrix form in which the velocity perturbation is represented as a vector of model parameters in an optimization problem to be iteratively solved by the gradient solver.

In Block 315, predicted data are determined based on the property model and the forward migration operator in accordance with one or more embodiments. For example, the predicted data may be determined based on a demigration equation (equation 3) using a depth-domain migration section (e.g., a reflectivity model) and Green's function extrapolated by the one-way wave equation.

$$p(x_r, t; x_s) = \int G(x', t; x_s) * s(t; x_s) * G(x_r, z=0, t; x') m(x') dx' \quad \text{Equation 3}$$

where G is the Green's function extrapolated by the one-way wave equation, the notation * represents a time convolution, and m(x') is reflectivity coefficient at location x' and represented by the associated migration profile, z is depth, t is travel time, and $x_r$ and $x_s$ are the receiver and source locations, respectively.

In Block 320, time shift between predicted data and obtained seismic data is determined using a segment dynamic image warping function in accordance with one or more embodiments. A segment dynamic image warping function improves accuracy of a dynamic image warping function to handle strong noise in input data. The misfit function of the segment dynamic image warping function applies point-wise segment-to-segment matching (equations 4 and 5) to calculate alignment error e [x, t, τ(t)] between processed demigrated data p' ($x_r$, t) and processed observed seismic data d'($x_r$, t). Thus, an approximate segment dynamic warping solution may be obtained by applying predetermined constraints on the time shift (equation 6 and 7). The segment dynamic image warping function can accurately estimate time shifts between images, even for strongly noisy data. It solves the below optimization problem:

$$\Delta\tau = \underset{\tau}{\operatorname{argmin}} \sum_{x=0}^{n_x} \sum_{t=0}^{n_t} e[x, t, \tau(x, t)] \quad \text{Equation 4}$$

$$e[x, t, \tau(t)] = \sum_{t'=-\delta t}^{t+\delta t} [p'(x, t+t') - d'(x, t+t' + \tau(x, t))]^2 \quad \text{Equation 5}$$

$$|\tau(x, t) - \tau(x, t-1)| \le \epsilon_t \quad \text{Equation 6}$$

$$|\tau(x, t) - \tau(x-1, t)| \le \epsilon_x \quad \text{Equation 7}$$

where p' ($x_r$, t) and d' ($x_r$, t) are stacked polynomial fitting result for each segment, and t' indicates the time dimension of each segment. $\epsilon_t$ and $\epsilon_x$ are predetermined constraints on the traveltime misfit along the time and signal location direction, respectively. δt denotes half segment length. $n_x$ and $n_t$ are the image size in horizontal and vertical direction, respectively.

For 1D case, a segment dynamic image warping function is also a segment dynamic time function. A segment dynamic time warping function may be applied in a discretized form in two steps. For example, in the first step, the segment dynamic time warping function uses polynomial fitting to approximate the input trace ƒ(t) and g(t) segment by segment to form the new signal ƒ'(t) and g'(t) (equation 8 and 9). In the second step, the segment dynamic time warping function uses ƒ'(t) and g'(t) as the new input traces to determine time shift Δl(t) in the optimization problem (equation 10) based on alignment error $e_1$ (equation 11) and predetermined constraint (equation 12).

$$f'(t) = \frac{\sum_{i=0}^{n-1} F_{i, t\in[t_i-\delta t_1, t_i+\delta t_1]}[f(t)]}{2\delta t_1 + 1} \quad \text{Equation 8}$$

$$g'(t) = \frac{\sum_{i=0}^{n-1} f_{i, t\in[t_i-\delta t_1, t_i+\delta t_1]}[g(t)]}{2\delta t_1 + 1} \quad \text{Equation 9}$$

$$\Delta l(t) = \underset{l}{\operatorname{argmin}} \sum_{t=0}^{n_t-1} e_1[t, l(t)] \quad \text{Equation 10}$$

$$e_1[t, l(t)] = \sum_{t'=-\delta t_2}^{t+\delta t_2} [f'(t+t') - g'(t+t' + l(t))]^{2q} \quad \text{Equation 11}$$

$$|l(t) - l(t-q)| \le \epsilon_t \quad \text{Equation 12}$$

where, n is the signal length, $F_{i,t}$ denotes the polynomial fitting operator at i-th segment within the range of $[t_i-\delta t_1, t_i+\delta t_1]$, and $t_1$ is the middle point of the i-th segment whose width is $2\delta t_1+1$. Δl(t) is the desired time shifts, l(t) is the integer lag, $\delta t_2$ denotes half segment length in the second step, t' indicates the time dimension of each segment, $e_1$ is the alignment error, and $\epsilon_t$ is a threshold limiting the shifts neither decrease or increase too rapidly in time direction t.

In Block 325, an adjoint source operator is determined using the determined time shift for a data-domain reflection traveltime inversion based on the property model and one-way wave equation in accordance with one or more embodiments. For example, an adjoint source operator for inversion may be determined from a predetermined connective function (equation 13) and a partial differentiation of the misfit function E with respect to demigration data p($x_r$, t; $x_s$) (equation 15). The predetermined connective function reaches the minimum for the correct shift Δτ (equation 14). As thus, the adjoint source operator for the misfit function (equation 16) may be determined based on time shift between demigrated data p($x_r$,t; $x_s$) and observed seismic data d($x_r$, t; $x_s$) (equation 13) by substituting equation 14 into equation 15.

$$c(x_r, \tau; x_s) = \int [p(x_r, t; x_s) - d(x_r, t + \tau(t); x_s)]^2 dt \quad \text{Equation 13}$$

$$\dot{c}(x_r, \Delta\tau; x_s) = \quad \text{Equation 14}$$

$$\int [d(x_r, t + \Delta\tau(t); x_s) - p(x_r, t; x_s)] \dot{d}(x_r, t + \Delta\tau(t); x_s) dt = 0$$

$$\delta r(x_r, t; x_s) = \frac{\partial E}{\partial p} = \Delta\tau(t) \frac{\partial \dot{c}(x_r, \Delta t; x_s)}{\partial p} \bigg/ \frac{\partial \dot{c}(x_r, \Delta t; x_s)}{\partial \Delta\tau} \quad \text{Equation 15}$$

$$\delta r(t) = \frac{\Delta\tau(t) \dot{d}(t + \Delta\tau(t))}{\int \ddot{d}(t + \Delta\tau(t))(p(t) - d(t + \Delta\tau(t))) + \dot{d}(t)^2 dt} \quad \text{Equation 16}$$

where c($x_r$, τ; $x_s$) is a predetermined connective function from source $x_s$ to receiver $x_r$. with a shift τ(t) at time t between demigrated data p($x_r$,t; $x_s$) and observed seismic data d($x_r$,t+τ(t); $x_s$). ċ is the first order derivative of the predetermined connective function c with respective to time t. Δτ is the time shift between two signals. t is travel time.

$$\frac{\partial}{\partial p}$$

is the first order derivative with respect to demigrated data p($x_r$,t; $x_s$).

$$\frac{\partial}{\partial \Delta\tau}$$

is the first order derivative with respect to time shift Δτ. ḋ is the first order derivative of the observed seismic data d($x_r$,t+τ(t); $x_s$) with respective to time t. d̈ is the second order derivative of the observed seismic data d($x_r$,t+T(t); $x_s$) with respective to time t.

Furthermore, the data-domain reflection traveltime inversion uses an adjoint source operator for acoustic one-way wave equations. For example, the adjoint source operator may be used to determine a gradient that is derived from a predetermined misfit function in a data-domain reflection traveltime inversion algorithm. For example, the adjoint source is used in a back propagation to calculate the gradient to update the property model of interest.

In Block 330, a gradient solver is determined in a data-domain reflection traveltime inversion using the forward migration operator and the adjoint source operator in accordance with one or more embodiments. The gradient solver may determine an update to the property model of interest by minimizing a predetermined misfit function (equation 1) based on the time shift determined by using a segment dynamic image warping function, the forward migration operator, and the adjoint source operator. Particularly, the gradient solver may backward project the adjoint source along the reflection wave paths. The property model update may be determined by a process consisting of 1) a back-propagation and construction of a new gradient with time shift between demigrated data and observed seismic data and the gradient solver based on the adjoint source operator, 2) a line search to derive a step length, and 3) a summation of the gradient scaled by the derived step length and the property model from last iteration.

In Block 335, the property model is updated using the gradient solver based on the adjoint source operator in accordance with one or more embodiments. For example, the updated property model may be determined by adding the property model update derived from the gradient solver to the property model from previous iteration. The convergence for the inversion depends on the gradient preconditioning, quality of the initial model and the iteration-stopping criterion. The convergence is enhanced by preconditioning the gradient using an illumination term generated by projecting the demigrated data along the wave path.

In Block 340, a determination is made whether the updated property model has converged to a predetermined criterion in accordance with one or more embodiments. For example, the predetermined criterion may be a misfit function, such as expressed in Equation 1. For example, when a value of the misfit function is smaller than a predetermined criterion (e.g., 5% of the initial misfit function value), convergence may be determined. As another example, the maximum iteration number reaches a predetermined criterion (e.g., a value of "25"). Where the property model has not converged to a predetermined criterion, the process may proceed to Block 315. Where the property model has converged to a predetermined criterion, the process may proceed to Block 345.

In Block 345, a final property model is outputted for full waveform inversion and a seismic image is generated based on the final property model for a geological region of interest in accordance with one or more embodiments. For example, the final property model may be used as an initial model for full waveform inversion to derive a high resolution model. As another example, the seismic image may be a P-wave image of subsurface reflectivity based on the final property model of interest after one or more iterations. The seismic image may apply one or more post-processing procedure to further enhance image resolution and/or geological structure continuation. Thus, the high resolution model and seismic image provide a spatial and depth illustration of a subterranean formation for various practical applications, such as predicting hydrocarbon deposits, predicting wellbore paths for geosteering, etc.

Figure 4:
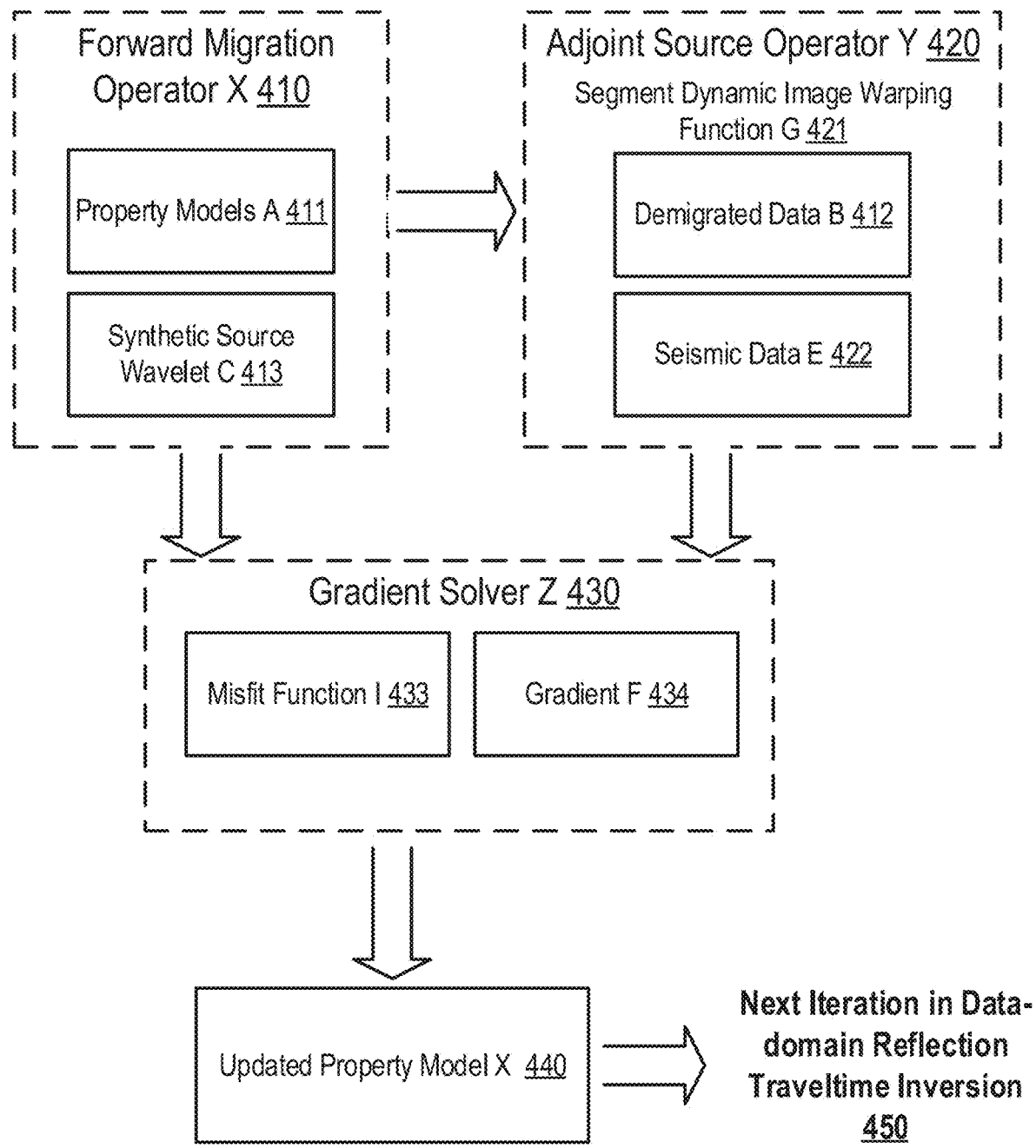
FIG. 4 shows an example in accordance with one or more embodiments.

Turning to FIG. 4, FIG. 4 provides an example of an iteration of a data-domain reflection traveltime inversion in accordance with one or more embodiments. As shown in FIG. 4, the data-domain reflection traveltime inversion applies forward migration operator X (410), adjoint source operator Y (420), gradient solver Z (430), and segment dynamic image warping function G (421) to obtain updated property model X (440). Using property models A (411) and a synthetic source wavelet C (413), a seismic interpreter applies the forward migration operator X (410) to determine forward wavefields and predicted data (e.g., demigrated data B (412)) obtained using a migration function. The seismic interpreter applies a segment dynamic image wrapping function (421) to determine time shift between demigrated data B (412) and seismic data E (422). Likewise, the seismic interpreter applies the adjoint source operator Y (420) to determine adjoint wavefields using time shift obtained using segment dynamic image wrapping function (421), demigrated data B (412), seismic data E (422), and the property models A (411). The seismic interpreter applies the gradient solver Z (430) to cross-correlate the forward wavefields and the adjoint wavefields to obtain a gradient F (434). Specifically, the gradient solver Z (430) applies an imaging condition and summation during the cross-correlation to generate the gradient at each iteration of the data-driven reflection traveltime inversion. Also, the gradient solver Z (430) determines the misfit function I (433) for each iteration which is stored for a history of convergence of the inversion process. Furthermore, the seismic interpreter uses the determined gradient (e.g., gradient F (434)) to obtained an updated property model (e.g., updated property model X (440)) that is used in next iteration in data-domain reflection traveltime inversion (450).

Figure 5A:
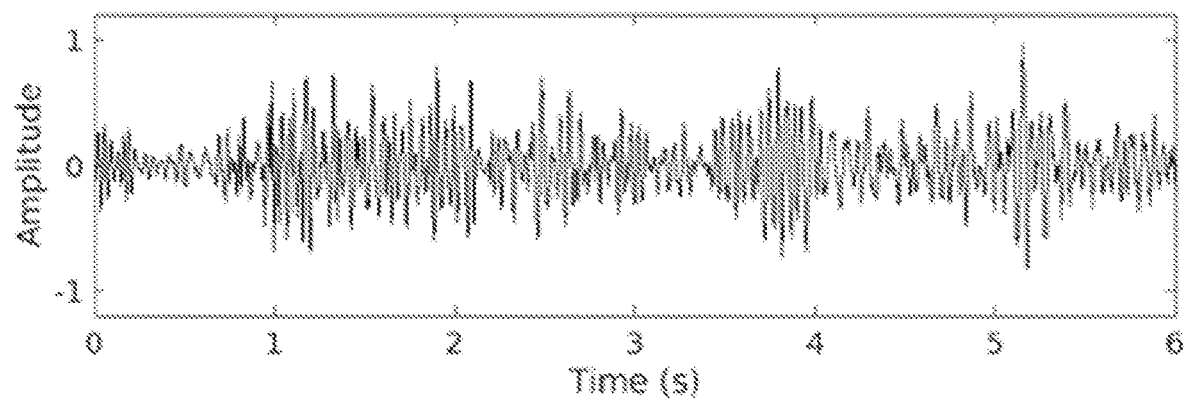
FIGS. 5A, 5B, and 5C show examples in accordance with one or more embodiments.
Figure 5B:
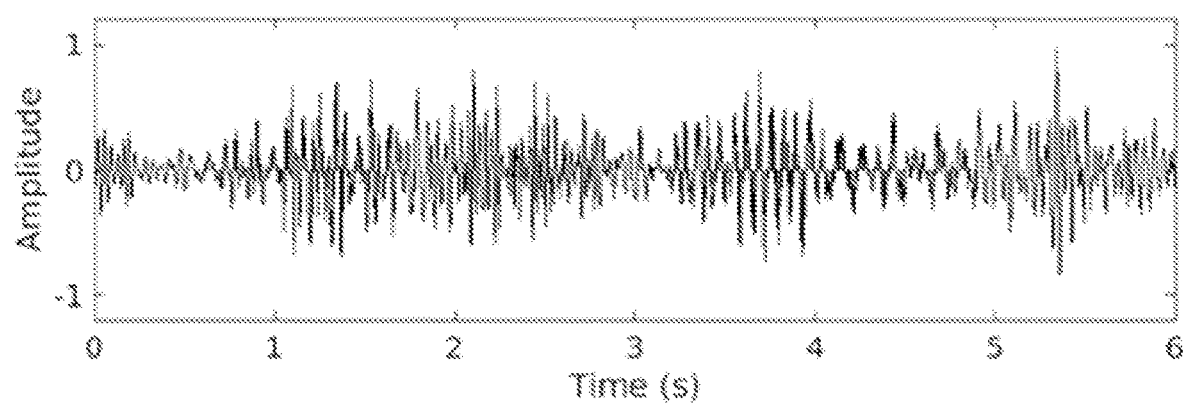
Figure 5C:
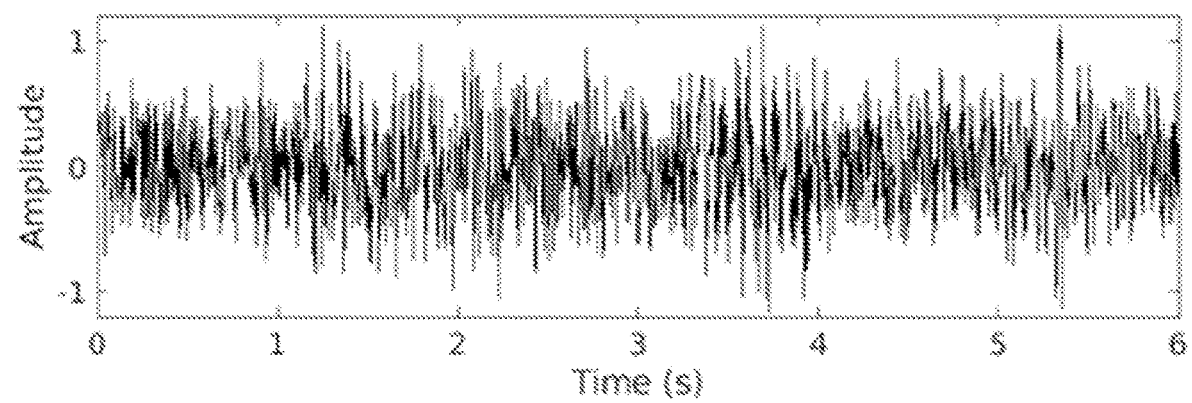

Turning to FIGS. 5A, 5B, and 5C, two signals are generated from real data to compare and validate the segment dynamic time warping function in presence of strong random noise. FIG. 5A shows a trace $f(t)$ with root-mean-square (RMS) amplitude of "0.24", which is extracted from a field land data. FIG. 5B shows a trace which is generated by applying a known shift to the trace in FIG. 5A. FIG. 5C shows a noisy warped trace g(t) which generated by adding strong random noise (e.g., an amplitude range from −0.5 to 0.5) to the trace in FIG. 5B. FIG. 5C shows there is severe contamination by noise and numerous events.

Turning to FIGS. 6A, 6B, 6C, and 6D, a comparison between a segment dynamic time warping function and a dynamic time warping function on the two traces in FIGS. 5A and 5C. The same parameters lag l∈(−200,200) and $\epsilon_t$=1 are used in the four tests. FIG. 6A shows a significant mismatch for the time shift determined by a dynamic time warping function (602) compared to true time shift (601). FIG. 6B shows strong discrepancy for the time shift determined only by the first step of a segment dynamic time warping function (603) compared to true time shift (601). FIG. 6C shows strong discrepancy for the time shift determined only by the second step of a segment dynamic time warping function (604) compared to true time shift (601). FIG. 6D shows a good match for the time shift determined by a segment dynamic time warping function (605) compared to true time shift (601).

Figure 7A:
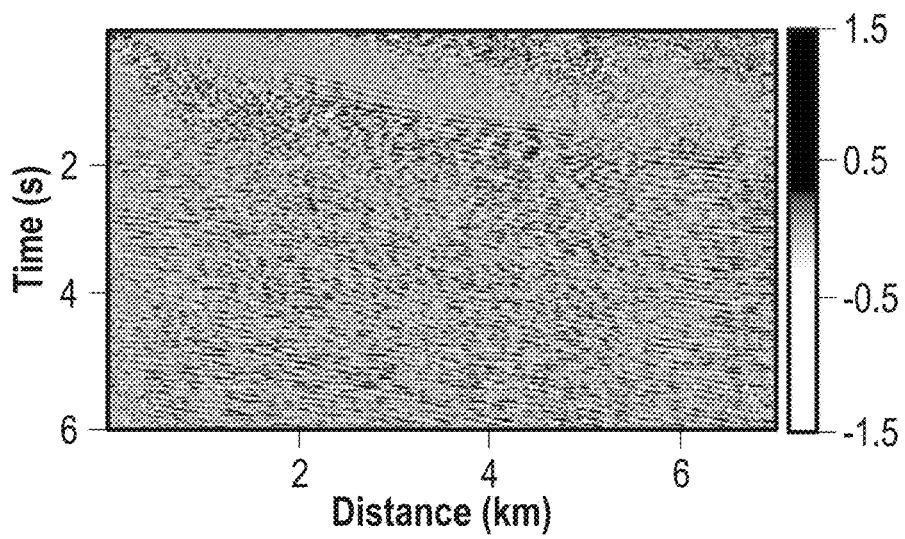
FIGS. 7A, 7B, 7C, 7D, 7E, and 7F show examples in accordance with one or more embodiments.
Figure 7B:
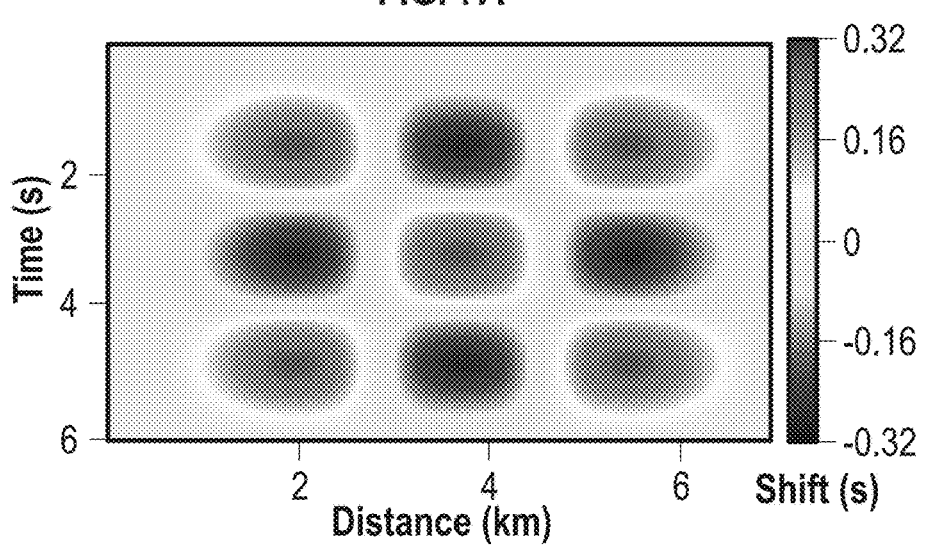
Figure 7C:
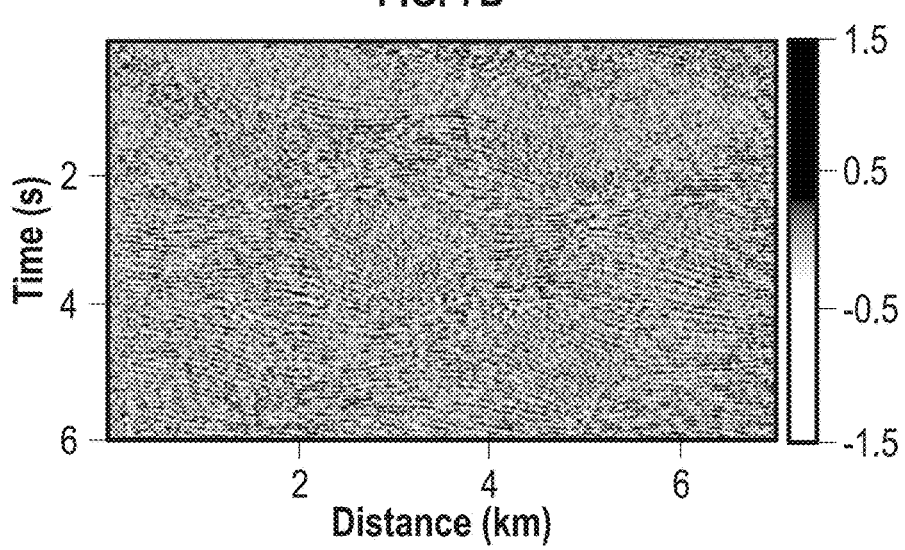
Figure 7D:
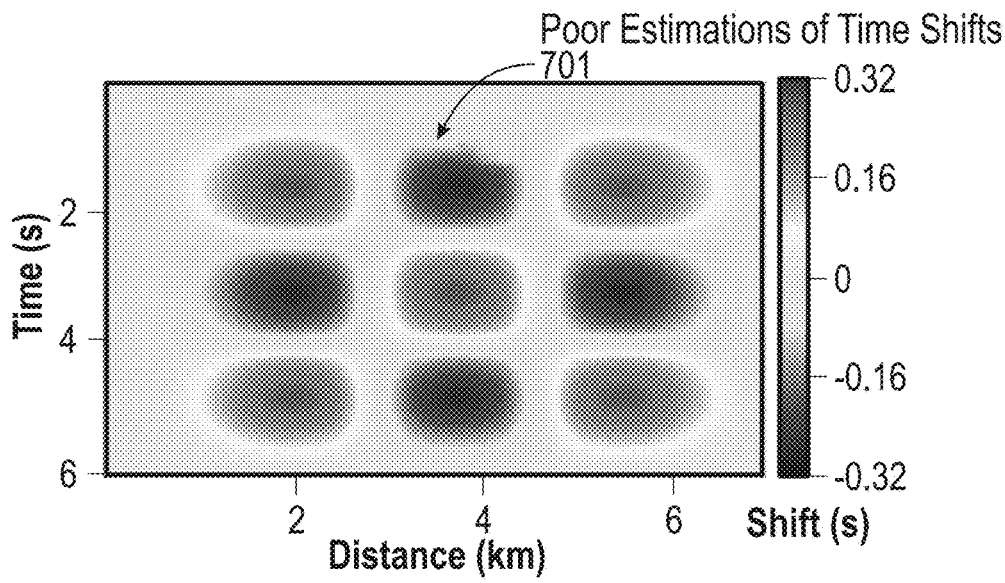
Figure 7E:
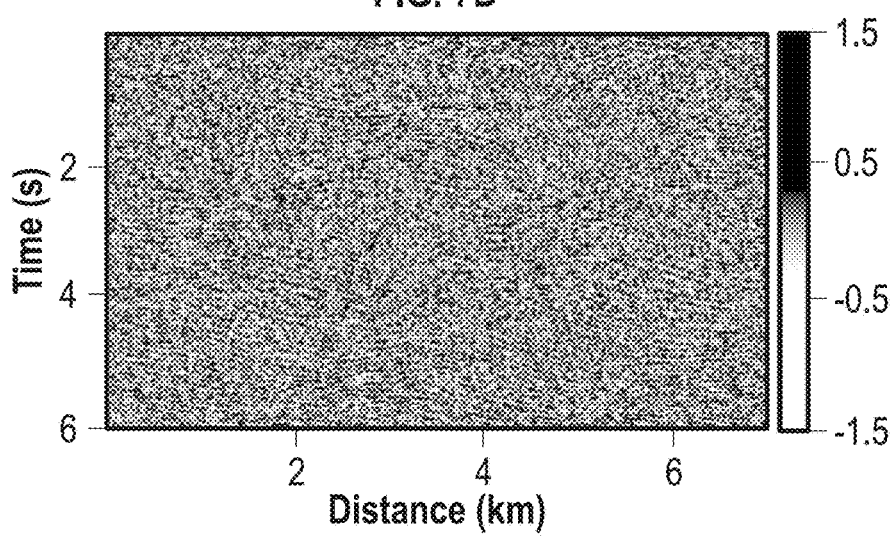
Figure 7F:
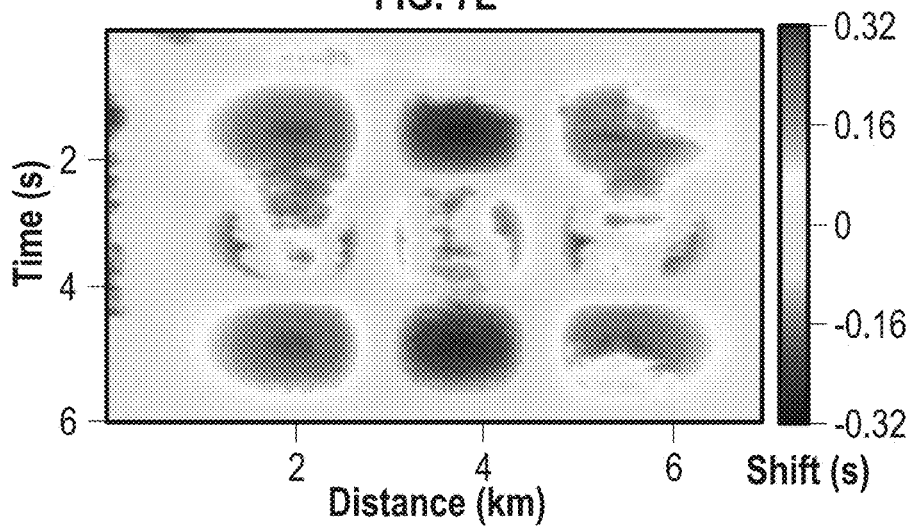

Turning to FIGS. 7A, 7B, 7C, 7D, 7E, and 7F, a dynamic image warping function is applied to determine time shifts between a shot gather in FIG. 7A and a shot gather that is generated from the shot gather in FIG. 7A by adding time shifts and random noise with various amplitudes. In this example, FIG. 7A shows a shot gather with an amplitude range from −1.5 to 1.5 and RMS amplitude is 0.22. FIG. 7B shows a ground truth of time shifts which are to be determined using a dynamic image warping function. FIG. 7C shows a shot gather by applying the time shifts in FIG. 7B and random noise with an intermediate amplitude (e.g., a range from −0.25 to 0.25) to the shot gather in FIG. 7A. FIG. 7D shows the determined time shifts agree well with the ground truth in FIG. 7B, despite of slight variations in a small area with poor estimations of time shifts (701). FIG. 7E shows a shot gather by applying the time shifts in FIG. 7B and random noise with a strong amplitude (e.g., a range from −0.5 to 0.5) to the shot gather in FIG. 7A. FIG. 7F shows the determined time shifts are degraded by strong noise when to compared to the ground truth in FIG. 7B.

Figure 8A:
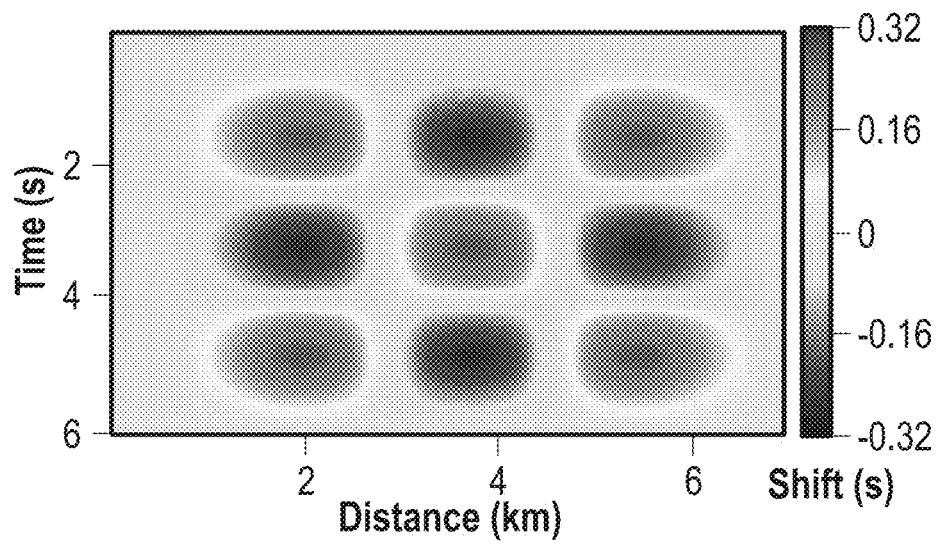
FIGS. 8A and 8B show examples in accordance with one or more embodiments.
Figure 8B:
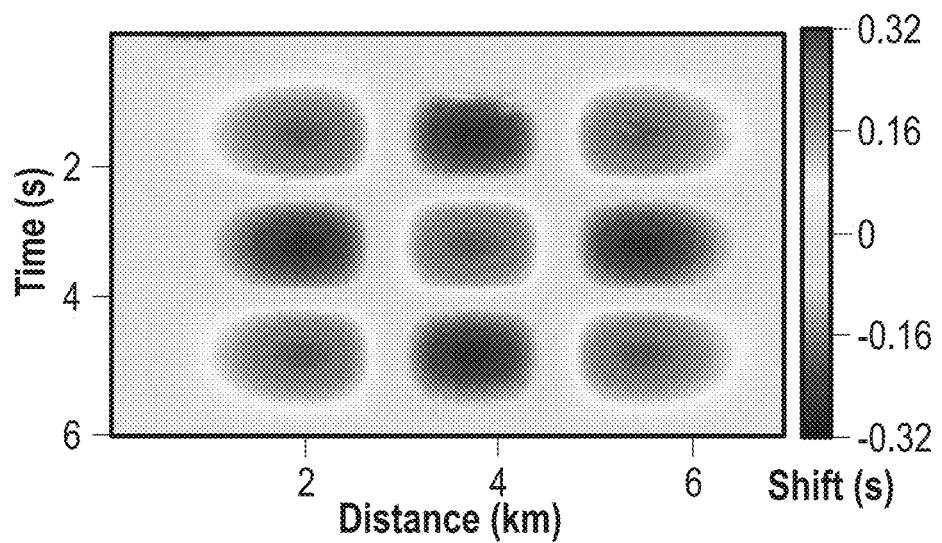

Turning to FIGS. 8A and 8B, a segment dynamic image warping function is applied to determine time shifts for the shot gathers in FIGS. 7C and 7E. FIG. 8A shows the determined time shifts for the shot gather as shown in FIG. 7C match the input time shifts in FIG. 7B, even in the area with poor estimation of time shifts (701). FIG. 8B shows the determined time shifts for the shot gather as shown in FIG. 7E match the input time shifts in FIG. 7B, even for strong random noise. FIGS. 8A and 8B also show a segment dynamic image warping function may determine more accurate time shifts for strong noisy input data than a dynamic image warping function because a segment dynamic image warping function uses windowed polynomial fitting to suppress the noises and further estimates the shift by segment-to-segment matching which can better capture the local structure information than point-to-point matching in a dynamic image warping function.

Figure 9A:
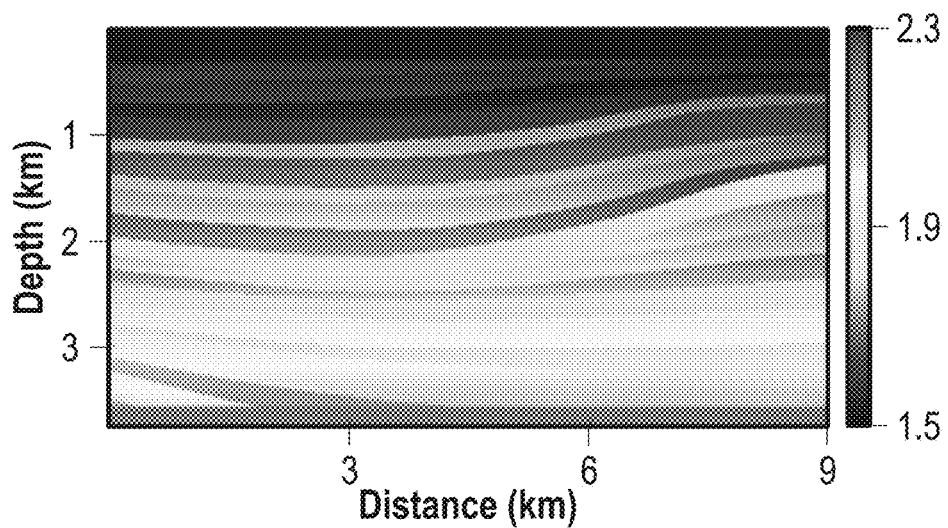
FIGS. 9A, 9B, 9C, 9D, 9E, 9F, 9G, and 9H show examples in accordance with one or more embodiments.
Figure 9B:
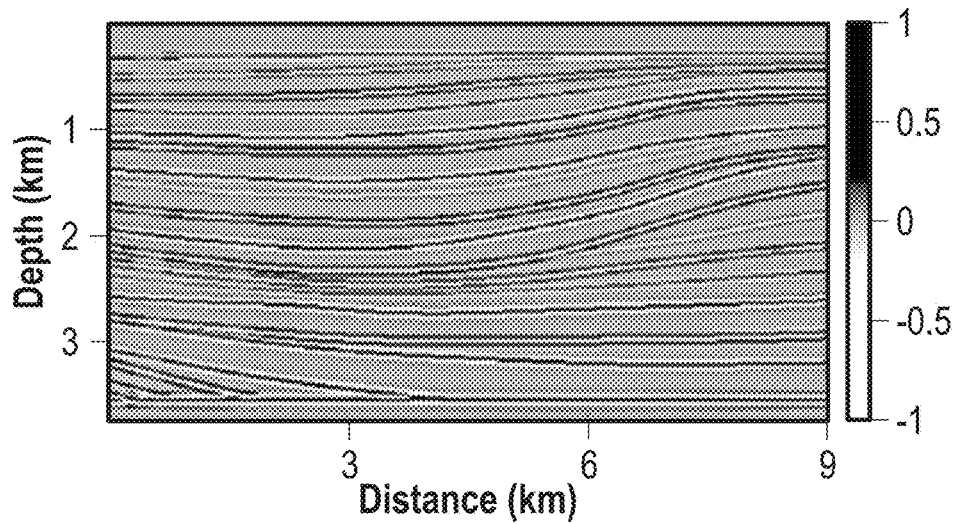
Figure 9C:
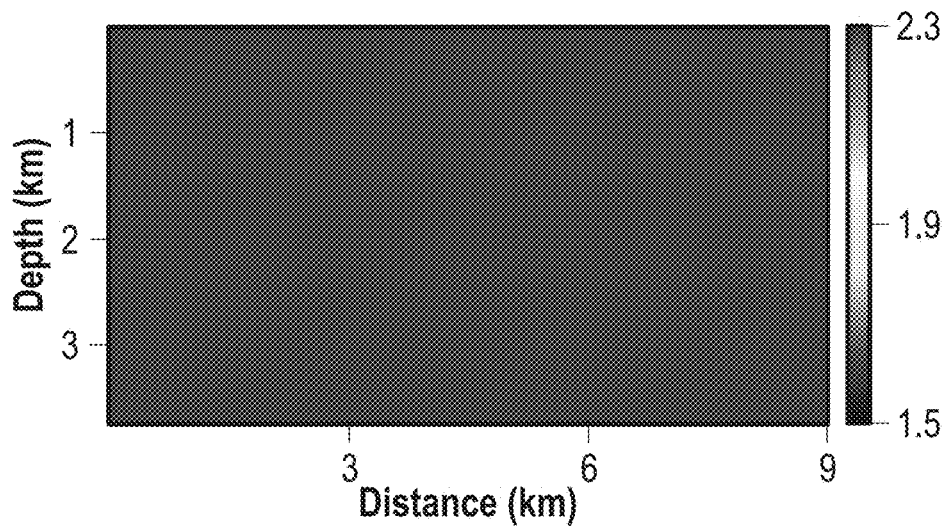
Figure 9D:
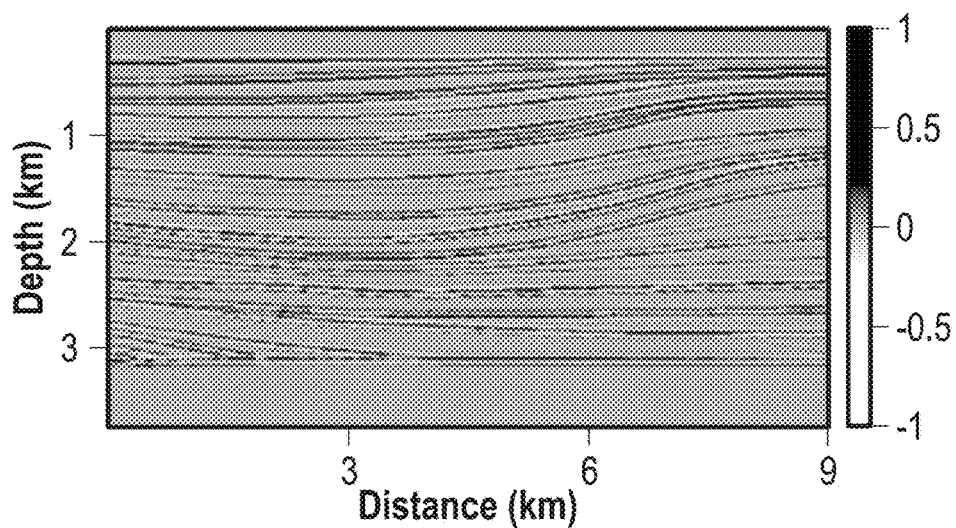

Turning to FIGS. 9A, 9B, 9C, 9D, 9E, 9F, 9G, and 9H, a seismic interpreter uses another example to apply a data-domain reflection traveltime inversion based on a segment dynamic image warping function and one-way wave equation for automatically inverting the background velocity models on a synthetic dataset for partial Sigsbee 2A model. FIG. 9A shows a ground truth velocity model (3.75 km by 9 km) with a syncline structure embedded with several shallow low-velocity layers. FIG. 9B shows a ground truth depth-domain migration image. The seismic interpreter uses a Ricker wavelet with a peak frequency of 12 Hz to generate 120 acoustic shot gathers. Each shot has 600 receivers uniformly distributed on the surface at a 15 m spacing. The maximum recording time is 6.0 s, and the time sampling interval is 3 milliseconds (ms). FIG. 9C shows an initial velocity model which is homogeneous with a constant value of 1500 m/s for the data-domain reflection traveltime inversion. FIG. 9D shows a depth-domain migration image using the initial homogenous velocity model. The geological structures as shown in FIG. 9D are incorrectly imaged at the wrong positions because of an incorrect velocity model used in seismic imaging when compared to the ground truth as shown in FIG. 9B.

Figure 9E:
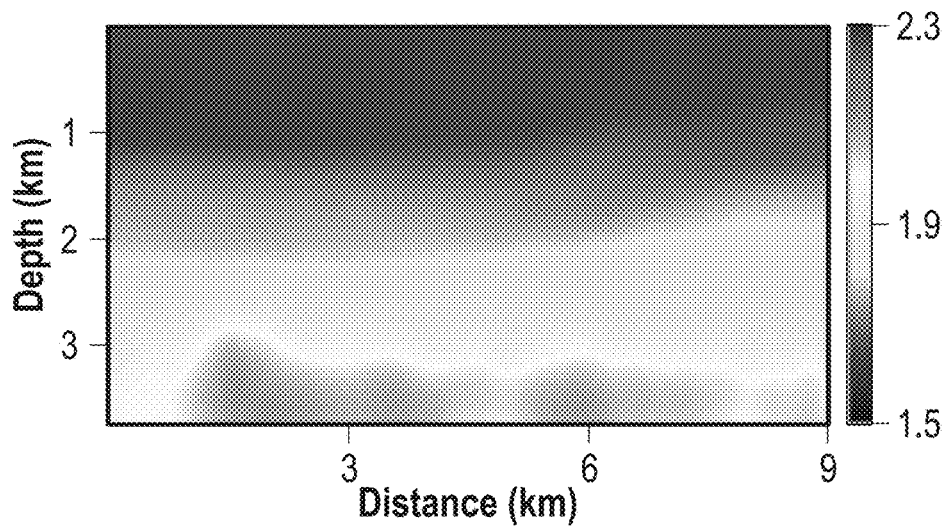
Figure 9F:
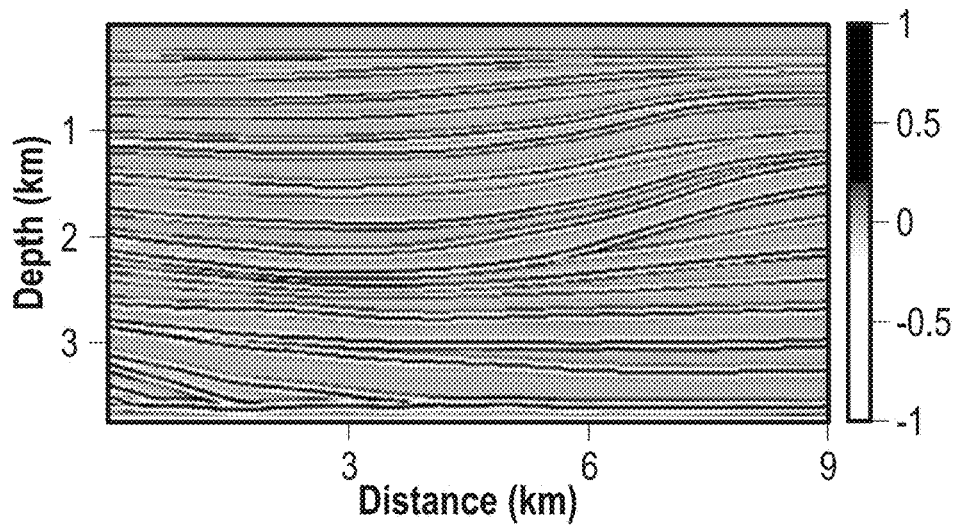
Figure 9G:
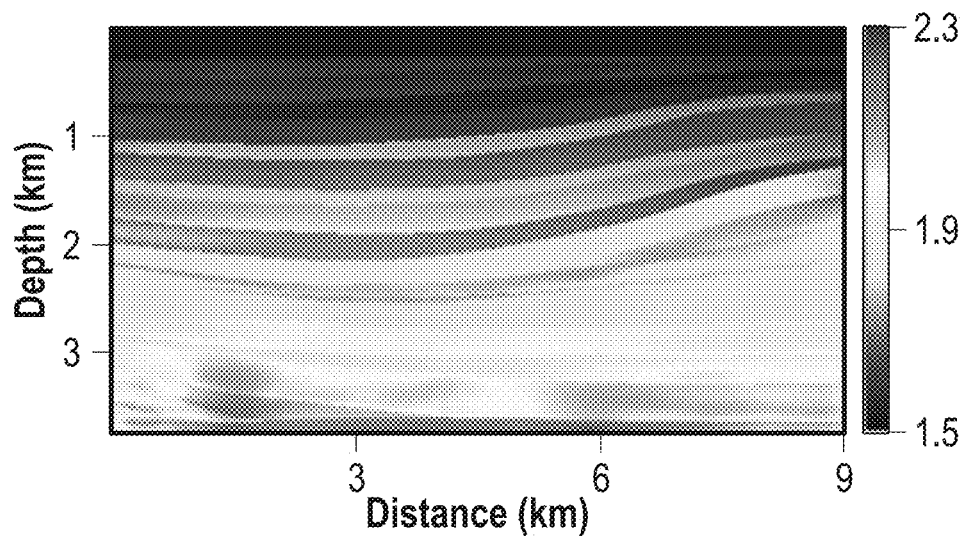
Figure 9H:
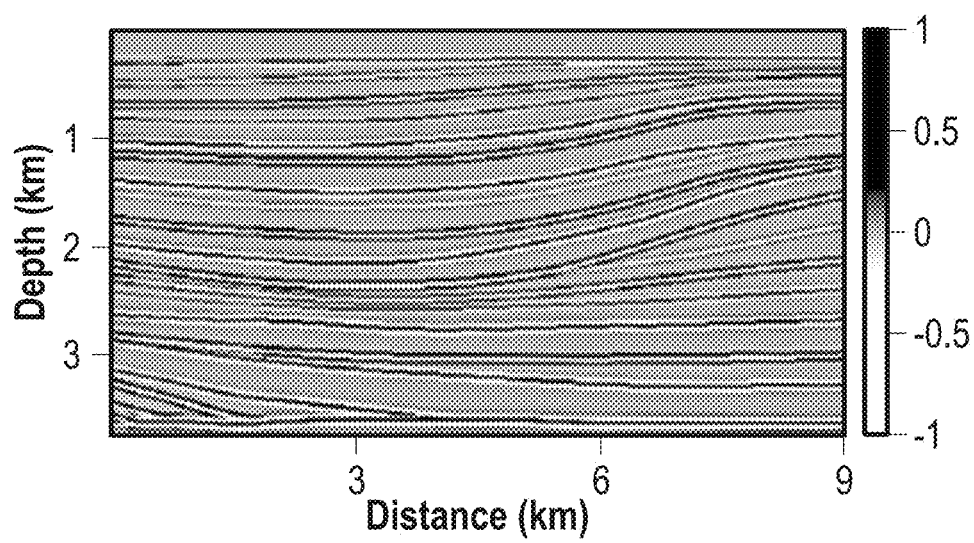

Furthermore, FIG. 9E shows a smooth background velocity model determined using the data-domain reflection traveltime inversion based on a segment dynamic image warping function after 22 iterations. FIG. 9F shows a depth-domain migration image shown associated with the smooth background velocity model as shown in FIG. 9E. The geological structures as shown in FIG. 9F are correctly imaged at the correct positions for the smooth background velocity model as shown in FIG. 9E when compared to the ground truth as shown in FIG. 9B. Likewise, FIG. 9F shows a high quality background velocity model is determined using the data-driven reflection traveltime inversion based on a segment dynamic image warping function. FIG. 9G shows a high resolution velocity model determined by full waveform inversion using the determined background velocity model in FIG. 5E as an initial model and the synthetics shot gathers above 4 Hz. FIG. 9G shows a good agreement with the ground truth velocity as shown in FIG. 9A. The slight mismatch at the left below corner of FIG. 9G is possibly due to the poor subsurface illumination. FIG. 9H shows a final depth-domain migration image based on the velocity model in FIG. 9G which is very close to the true image as shown in FIG. 9B.

Figure 10A:
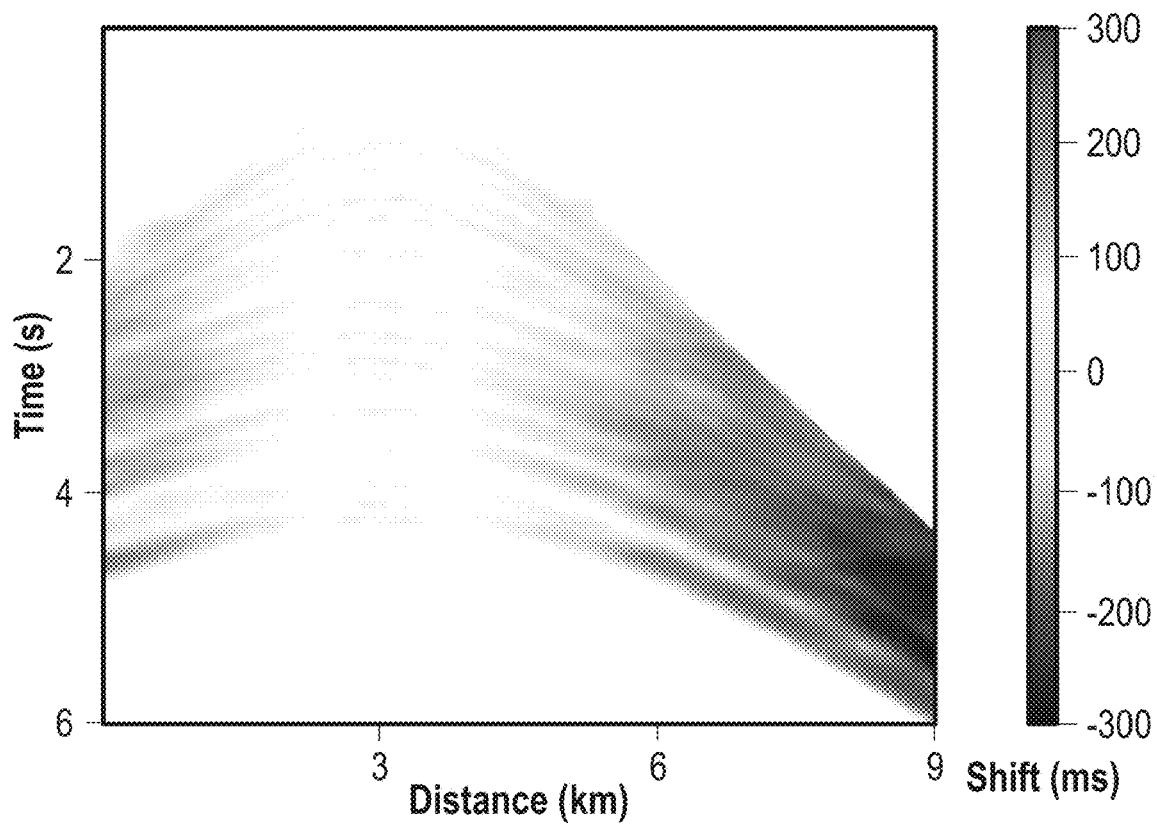
FIGS. 10A, 10B, 10C, and 10D show an examples in accordance with one or more embodiments.
Figure 10B:
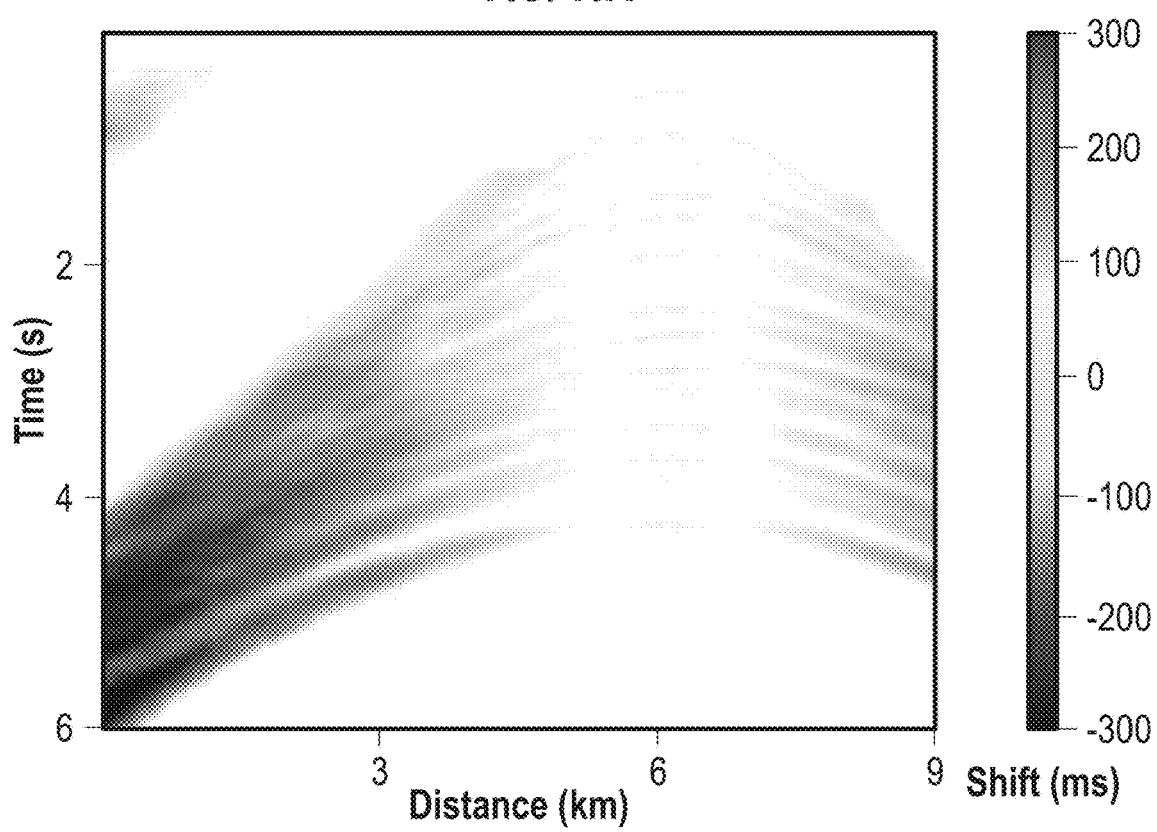
Figure 10C:
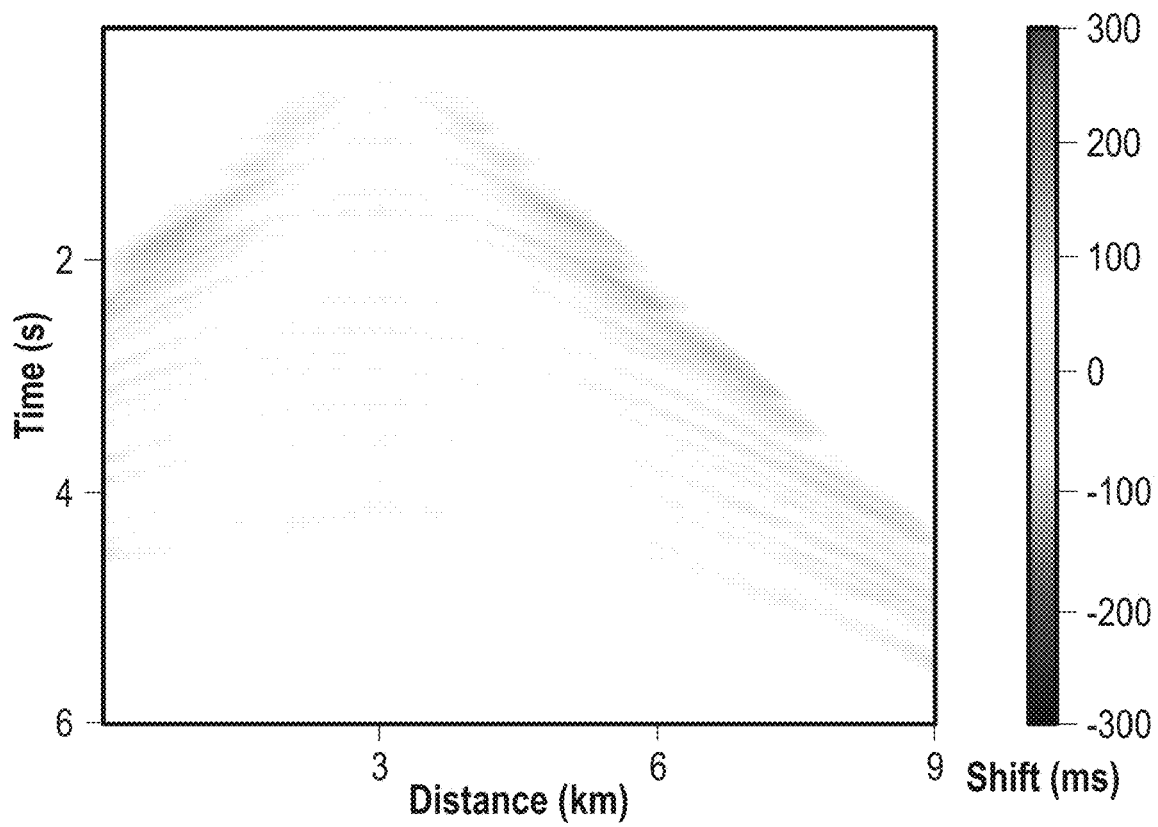
Figure 10D:
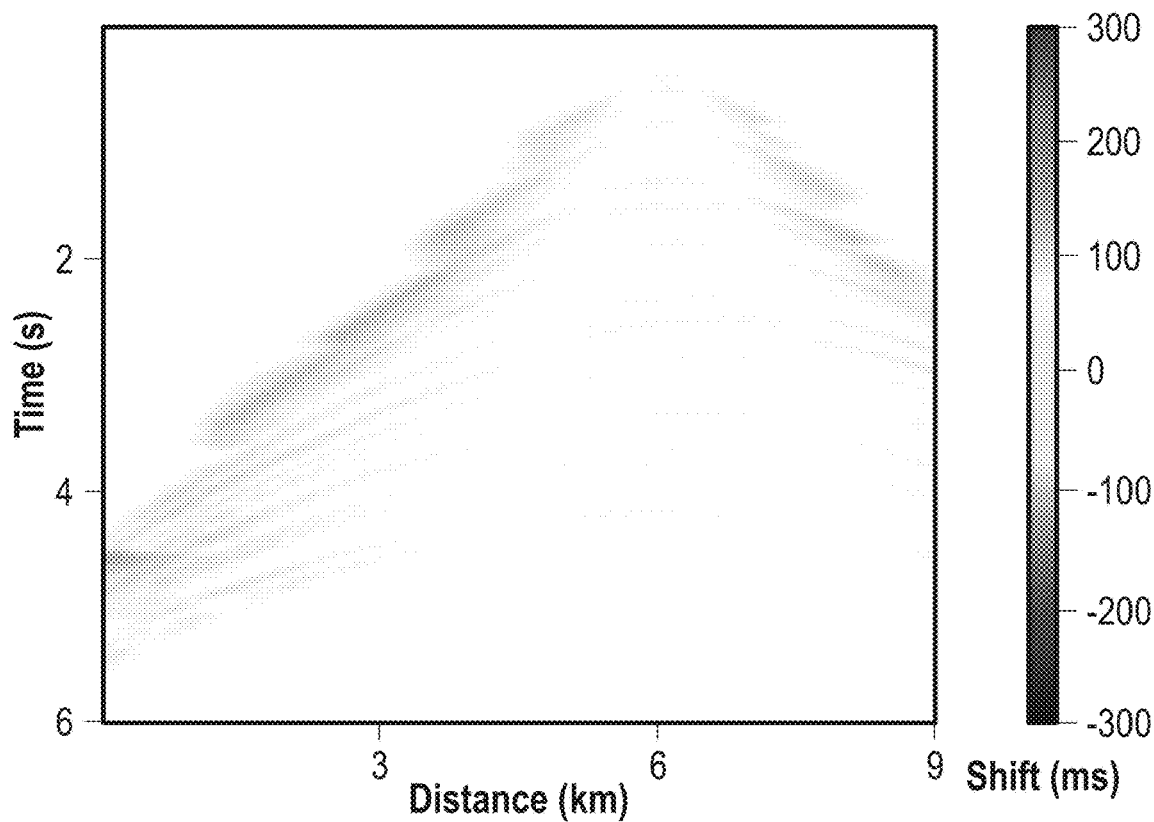

Turning to FIGS. 10A, 10B, 10C, and 10D, the seismic interpreter compares traveltime and amplitude matching between demigrated data and observed data. FIGS. 10A and 10B show the time shift determined by using a segment dynamic image warping function for two representative shot gathers (e.g., $40^{th}$ shot gather and $80^{th}$ shot gather in the synthetics dataset) based on the initial velocity model as shown in FIG. 9C. FIGS. 10C and 10D show the time shift determined by using a segment dynamic image warping function for the same shot gathers based on the final smooth background velocity model as shown in FIG. 9E derived from a data-domain reflection traveltime inversion. The comparison clearly shows that the data-domain reflection traveltime inversion greatly reduces the traveltime difference between observed data and demigrated data, which indicates a high quality initial model for the following full waveform inversion.

Figure 11A:
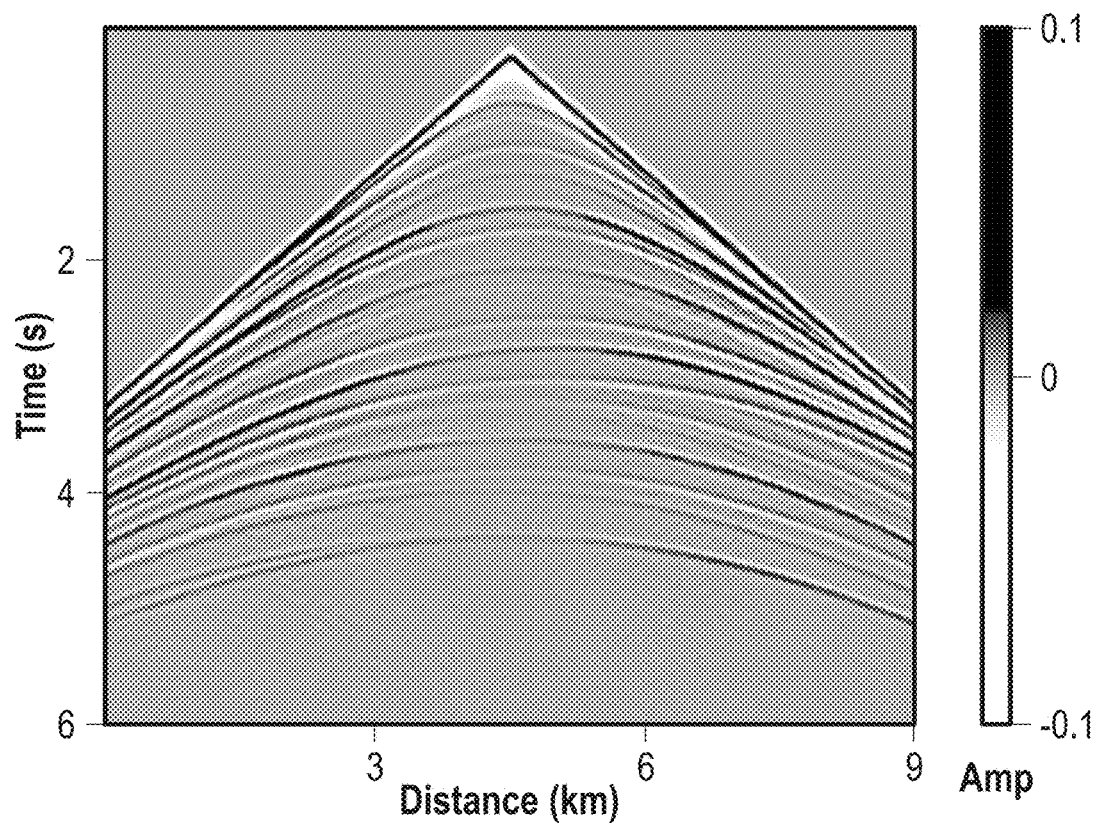
FIGS. 11A and 11B show an examples in accordance with one or more embodiments.
Figure 11B:
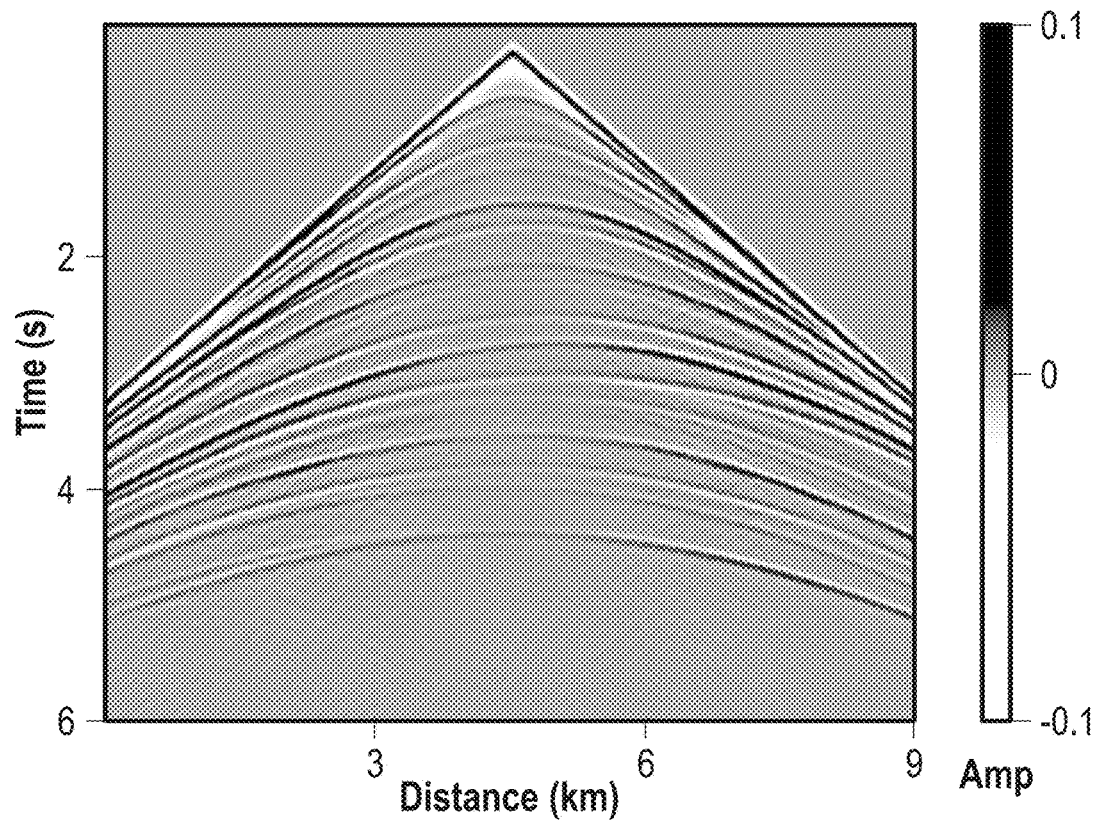

Turning to FIGS. 11A and 11B, FIGS. 11A and 11B show the comparison between observed data (e.g., $60^{th}$ shot gather in the synthetics dataset) as shown in FIG. 11A and demigrated data as shown in FIG. 11B using the final velocity model as shown in FIG. 9G using full waveform inversion. The good match between demigrated data and observed seismic data show the velocity model derived from full waveform inversion has a high fidelity to generate a close-to-true shot gather. Thus, it is verified that the data-domain reflection traveltime inversion using a segment dynamic image warping function may provide a good initial velocity model for full waveform inversion even without low-frequency data to build a high-quality final velocity model.

Figure 12:
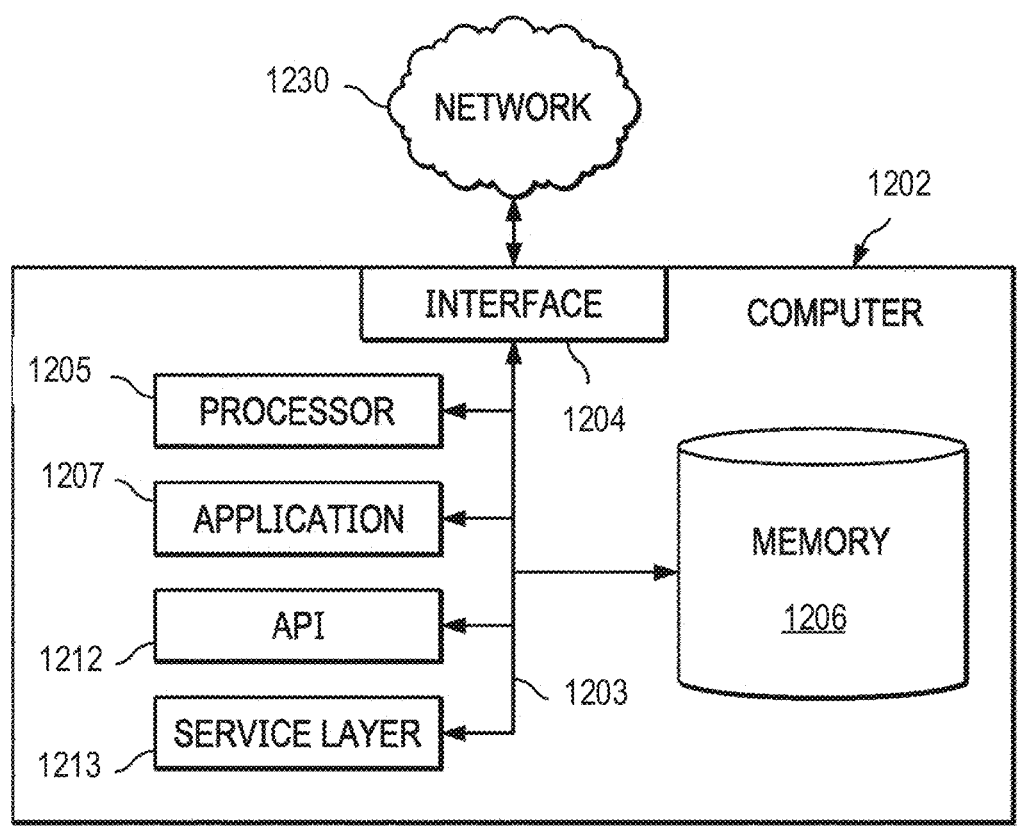
FIG. 12 shows a computing system in accordance with one or more embodiments.

Embodiments may be implemented on a computer system. FIG. 12 is a block diagram of a computer system used to provide computational functionalities associated with described algorithms, methods, functions, processes, flows, and procedures as described in the instant disclosure, according to an implementation. The illustrated computer (1202) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1202) may include a computer that includes an input device, such as a keypad, keyboard, touch screen, or other device that can accept user information, and an output device that conveys information associated with the operation of the computer (1202), including digital data, visual, or audio information (or a combination of information), or a GUI.

The computer (1202) can serve in a role as a client, network component, a server, a database or other persistency, or any other component (or a combination of roles) of a computer system for performing the subject matter described in the instant disclosure. The illustrated computer (1202) is communicably coupled with a network (1230) or cloud. In some implementations, one or more components of the computer (1202) may be configured to operate within environments, including cloud-computing-based, local, global, or other environment (or a combination of environments).

At a high level, the computer (1202) is an electronic computing device operable to receive, transmit, process, store, or manage data and information associated with the described subject matter. According to some implementations, the computer (1202) may also include or be communicably coupled with an application server, e-mail server, web server, caching server, streaming data server, business intelligence (BI) server, or other server (or a combination of servers).

The computer (1202) can receive requests over network (1230) or cloud from a client application (for example, executing on another computer (1202)) and responding to the received requests by processing the said requests in an appropriate software application. In addition, requests may also be sent to the computer (1202) from internal users (for example, from a command console or by other appropriate access method), external or third-parties, other automated applications, as well as any other appropriate entities, individuals, systems, or computers.

Each of the components of the computer (1202) can communicate using a system bus (1203). In some implementations, any or all of the components of the computer (1202), both hardware or software (or a combination of hardware and software), may interface with each other or the interface (1204) (or a combination of both) over the system bus (1203) using an application programming interface (API) (1212) or a service layer (1213) (or a combination of the API (1212) and service layer (1213). The API (1212) may include specifications for routines, data structures, and object classes. The API (1212) may be either computer-language independent or dependent and refer to a complete interface, a single function, or even a set of APIs. The service layer (1213) provides software services to the computer (1202) or other components (whether or not illustrated) that are communicably coupled to the computer (1202). The functionality of the computer (1202) may be accessible for all service consumers using this service layer. Software services, such as those provided by the service layer (1213), provide reusable, defined business functionalities through a defined interface. For example, the interface may be software written in JAVA, C++, or other suitable language providing data in extensible markup language (XML) format or other suitable format. While illustrated as an integrated component of the computer (1202), alternative implementations may illustrate the API (1212) or the service layer (1213) as stand-alone components in relation to other components of the computer (1202) or other components (whether or not illustrated) that are communicably coupled to the computer (1202). Moreover, any or all parts of the API (1212) or the service layer (1213) may be implemented as child or sub-modules of another software module, enterprise application, or hardware module without departing from the scope of this disclosure.

The computer (1202) includes an interface (1204). Although illustrated as a single interface (1204) in FIG. 12, two or more interfaces (1204) may be used according to particular needs, desires, or particular implementations of the computer (1202). The interface (1204) is used by the computer (1202) for communicating with other systems in a distributed environment that are connected to the network (1230). Generally, the interface (1204 includes logic encoded in software or hardware (or a combination of software and hardware) and operable to communicate with the network (1230) or cloud. More specifically, the interface (1204) may include software supporting one or more communication protocols associated with communications such that the network (1230) or interface's hardware is operable to communicate physical signals within and outside of the illustrated computer (1202).

The computer (1202) includes at least one computer processor (1205). Although illustrated as a single computer processor (1205) in FIG. 12, two or more processors may be used according to particular needs, desires, or particular implementations of the computer (1202). Generally, the computer processor (1205) executes instructions and manipulates data to perform the operations of the computer (1202) and any algorithms, methods, functions, processes, flows, and procedures as described in the instant disclosure.

The computer (1202) also includes a memory (1206) that holds data for the computer (1202) or other components (or a combination of both) that can be connected to the network (1230). For example, memory (1206) can be a database storing data consistent with this disclosure. Although illustrated as a single memory (1206) in FIG. 12, two or more memories may be used according to particular needs, desires, or particular implementations of the computer (1202) and the described functionality. While memory (1206) is illustrated as an integral component of the computer (1202), in alternative implementations, memory (1206) can be external to the computer (1202).

Furthermore, memory (1206) can be a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory (1206) may be called a register, a cache, a main memory (main storage apparatus), or the like. Memory (1206) can save a program (program code), a software module, and the like that can be executed to carry out the radio communication method according to an embodiment of the present invention.

The application (1207) is an algorithmic software engine providing functionality according to particular needs, desires, or particular implementations of the computer (1202), particularly with respect to functionality described in this disclosure. For example, application (1207) can serve as one or more components, modules, applications, etc. Further, although illustrated as a single application (1207), the application (1207) may be implemented as multiple applications (1207) on the computer (1202). In addition, although illustrated as integral to the computer (1202), in alternative implementations, the application (1207) can be external to the computer (1202).

There may be any number of computers (1202) associated with, or external to, a computer system containing computer (1202), each computer (1202) communicating over network (1230). Further, the term "client," "user," and other appropriate terminology may be used interchangeably as appropriate without departing from the scope of this disclosure. Moreover, this disclosure contemplates that many users may use one computer (1202), or that one user may use multiple computers (1202).

In some embodiments, the computer (1202) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A computer-implemented method, comprising:
   obtaining, by a computer processor, seismic data acquired in a time-domain for a subterranean region of interest;
   obtaining, by the computer processor, a property model for the subterranean region of interest;
   determining, by the computer processor, based on the seismic data and the property model, a time shift between predicted data and the acquired seismic data using a multi-dimension algorithm to:
      apply windowed polynomial fitting for signal preconditioning using predicted data and the acquired seismic data as inputs,
      align the preconditioned signals of interest based on point-wise segment-to-segment matching for each segment, and
      include a threshold for the time shift in each dimension;
   determining, by the computer processor, an adjoint source operator using the time shift and one-way wave equation;
   updating, by the computer processor, the property model using a gradient solver in a data-domain reflection traveltime inversion;
   outputting, by the computer processor, the updated property model for the subterranean region of interest; and
   generating, by the computer processor, a seismic image for the subterranean region of interest using the updated property model.

2. The method of claim 1,
   wherein the updated property model is used as an initial model for full waveform inversion to update short-wavelength components of the property model.

3. The method of claim 1,
   determining, using the computer processor, a presence of hydrocarbons in the geological region of interest using the seismic image.

4. The method of claim 1,
   wherein a forward migration operator is based on one-way wave equation for acoustic waves, and
   wherein the adjoint source operator is based on one-way wave equation for acoustic waves.

5. The method of claim 4,
   wherein the adjoint source operator generates a plurality of adjoint wavefields based on the seismic data,
   wherein the forward migration operator generates a plurality of forward wavefields based on the seismic data, and
   wherein the forward migration operator generates predicted data based on the seismic data and a reflectivity model.

6. The method of claim 1,
   wherein the property model is updated iteratively until a misfit function corresponding to a time shift difference between predicted data and acquired seismic data converges to a predetermined criterion.

7. The method of claim 1,
   wherein the gradient solver determines a residual value based on an output of the misfit function, and
   wherein the property model is updated based on the residual value.

8. The method of claim 1,
   obtaining a velocity model regarding the geological region of interest,
   wherein the property model is a reflection model, and
   wherein the property model is updated using the velocity model.

9. The method of claim 8, further comprising:
   acquiring, using a seismic surveying system, the seismic data regarding the geological region of interest; and
   generating the velocity model using the seismic data and a seismic inversion operation.

10. A system, comprising:
    a seismic surveying system comprising a seismic source and a plurality of seismic receivers; and
    a seismic interpreter comprising a computer processor, wherein the seismic interpreter is coupled to the seismic surveying system, the seismic interpreter comprising functionality for:
       obtaining seismic data acquired in a time-domain for a subterranean region of interest;
       obtaining a property model for the subterranean region of interest;
       determining, based on the seismic data and the property model, a time shift between predicted data and acquired seismic data using a multi-dimension algorithm to:
          apply windowed polynomial fitting for signal preconditioning using predicted data and acquired seismic data as inputs,
          align the preconditioned signals of interest based on point-wise segment-to-segment matching for each segment, and
          include a threshold for the time shift in each dimension;
       determining an adjoint source operator using the time shift and one-way wave equation;
       updating the property model using a gradient solver in a data-domain reflection traveltime inversion;
       outputting the updated property model for the subterranean region of interest; and
       generating a seismic image for the subterranean region of interest using the updated property model.

11. The system of claim 10,
    wherein a forward migration operator is based on one-way wave equation for acoustic waves, and
    wherein the adjoint source operator is based on one-way wave equation for acoustic waves.

12. The system of claim 11,
wherein the adjoint source operator generates a plurality of adjoint wavefields based on the seismic data,
wherein the forward migration operator generates a plurality of forward wavefields based on the seismic data, and
wherein the forward migration operator generates predicted data based on the seismic data and a reflectivity model.

13. The system of claim 10,
wherein the property model is updated iteratively until a misfit function corresponding to a time shift difference between predicted data and acquired seismic data converges to a predetermined criterion.

14. The system of claim 10,
wherein the gradient solver determines a residual value based on an output of the misfit function, and
wherein the property model is updated based on the residual value.

15. A non-transitory computer readable medium storing instructions executable by a computer processor, the instructions comprising functionality for:
  obtaining seismic data acquired in a time-domain for a subterranean region of interest;
  obtaining a property model for the subterranean region of interest;
  determining based on the seismic data and the property model, a time shift between predicted data and the acquired seismic data using a multi-dimension algorithm to:
    apply windowed polynomial fitting for signal preconditioning using predicted data and the acquired seismic data as inputs,
    align the preconditioned signals of interest based on point-wise segment-to-segment matching for each segment, and
    include a threshold for the time shift in each dimension;
  determining an adjoint source operator using the time shift and one-way wave equation;
  updating the property model using a gradient solver in a data-domain reflection traveltime inversion;
  outputting the updated property model for the subterranean region of interest; and
  generating a seismic image for the subterranean region of interest using the updated property model.

* * * * *